(12) United States Patent
Nakajima et al.

(10) Patent No.: US 12,271,779 B2
(45) Date of Patent: Apr. 8, 2025

(54) DISPLAY CONTROL SYSTEM, INFORMATION PROCESSING APPARATUS, AND COMPUTER-READABLE MEDIUM

(71) Applicant: CANON KABUSHIKI KAISHA, Tokyo (JP)

(72) Inventors: Yuki Nakajima, Kanagawa (JP); Yasuhiro Shimura, Kanagawa (JP); Toshifumi Kitamura, Shizuoka (JP); Junna Takase, Shizuoka (JP); Yasuhiro Tomioka, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/645,171

(22) Filed: Apr. 24, 2024

(65) Prior Publication Data

US 2024/0362434 A1 Oct. 31, 2024

(30) Foreign Application Priority Data

Apr. 26, 2023 (JP) ................................. 2023-072671

(51) Int. Cl.
*G06K 7/10* (2006.01)
(52) U.S. Cl.
CPC ................................. *G06K 7/10366* (2013.01)
(58) Field of Classification Search
CPC . G06K 7/10366; G01S 5/0284; G01S 5/0295; G06Q 10/087
See application file for complete search history.

(56) References Cited

U.S. PATENT DOCUMENTS

| 11,671,190 B2 | 6/2023 | Nishimura |
| 2003/0211853 A1* | 11/2003 | Banno ................... G01S 5/0072 455/456.6 |
| 2017/0092090 A1 | 3/2017 | Lerner |

(Continued)

FOREIGN PATENT DOCUMENTS

| EP | 4116730 A1 | 1/2023 |
| JP | 2004294403 A | 10/2004 |

(Continued)

OTHER PUBLICATIONS

European Patent Office, Extended Search Report for Application No. 24169168.2, Sep. 2024.

*Primary Examiner* — Jamara A Franklin
(74) *Attorney, Agent, or Firm* — Canon U.S.A., Inc. IP Division

(57) ABSTRACT

A display control system includes a first wireless device attached to a management target and storing first identification information for identifying the management target, a second wireless device installed at a predetermined position and storing second identification information, a reading apparatus, at least one processor, and at least one memory. The processor and memory are configured to estimate a located position of the management target based on reading results of the first identification information at a first reading time and the second identification information at a second reading time and cause a display apparatus to display an estimated area within which the management target is estimated to be located based on the located position. A magnitude of the estimated area is based on an amount of movement of the reading apparatus between the first reading time and the second reading time.

16 Claims, 21 Drawing Sheets

(56) References Cited

U.S. PATENT DOCUMENTS

| 2018/0293535 | A1 | 10/2018 | Christopher |
| 2022/0417895 | A1 | 12/2022 | Shimura et al. |
| 2024/0176964 | A1 | 5/2024 | Murofushi et al. |

FOREIGN PATENT DOCUMENTS

| JP | 2007085826 | A | 4/2007 |
| JP | 2020129312 | A | 8/2020 |
| JP | 6910100 | B2 | 7/2021 |
| JP | 2021141415 | A | 9/2021 |
| JP | 2023038808 | A | 3/2023 |
| JP | 7342826 | B2 | 9/2023 |
| WO | 2023026649 | A1 | 3/2023 |

* cited by examiner

FIG. 5

| TAG ID | TARGET ID | NAME | TARGET TYPE |
|---|---|---|---|
| TG011 | IT11 | MATERIAL A1 | T1 |
| TG012 | IT12 | MATERIAL A2 | T1 |
| TG021 | IT21 | MATERIAL B1 | T2 |
| TG022 | IT22 | MATERIAL B2 | T2 |
| TG031 | IT31 | EQUIPMENT C1 | T3 |
| : | : | : | : |
| TG091 | UR91 | WORKER Z1 | T9 |
| : | : | : | : |

FIG. 6

| SECTION ID | NAME | PARENT SECTION | MAP | SCALE | ORIENTATION |
|---|---|---|---|---|---|
| A000 | SITE A | — | IMA0 | xxx | yyy |
| AA00 | BUILDING A | A000 | — | — | — |
| AA10 | FLOOR A1 | AA00 | IMA1 | xxx | yyy |
| AA20 | FLOOR A2 | AA00 | IMA2 | xxx | yyy |
| AA21 | ROOM A2-1 | AA20 | — | — | — |
| AA22 | ROOM A2-2 | AA20 | — | — | — |
| ⋮ | ⋮ | ⋮ | ⋮ | ⋮ | ⋮ |
| B000 | SITE B | — | IMB0 | xxx | yyy |
| ⋮ | ⋮ | ⋮ | ⋮ | ⋮ | ⋮ |

321  322  323  325  326  327

320

F I G. 12

| TARGET ID | LOCATED POSITION | LOCATED SECTION | REFERENCE POSITION TAG | ESTIMATION ERROR | READING TIME | READER |
|---|---|---|---|---|---|---|
| IT11 | (u1, v1, h1) | AA10 | TG511 | e5 | ymd5 | RD01 |
| IT21 | (u2, v2, h2) | AA10 | TG511 | e6 | ymd6 | RD01 |
| .. | .. | .. | .. | .. | .. | .. |

⋯⋯ : READER'S MOVEMENT PATH
☆ : ESTIMATED POSITION OF MANAGEMENT TARGET
◯ : ESTIMATED AREA

⋯⋯ : READER'S MOVEMENT PATH
☆ : ESTIMATED POSITION OF MANAGEMENT TARGET
◯ : ESTIMATED AREA

DISPLAY CONTROL SYSTEM, INFORMATION PROCESSING APPARATUS, AND COMPUTER-READABLE MEDIUM

BACKGROUND

Field of the Disclosure

The present disclosure relates to a display control system, an information processing apparatus, and a computer-readable medium.

Description of the Related Art

Radio frequency identification (RFID) is a technology that allows information embedded in a small device, which is also referred to as a tag, to be read by an external reader through short-range wireless communication. For example, an RFID tag in which unique identification information is embedded is attached to an item so that a location of the item can be efficiently recognized and that visualization of information on managed items can be facilitated. Among others, a passive type RFID tag, which transmits information utilizing energy of electromagnetic waves emitted from a reader, does not require a battery and thus is low-cost in manufacturing, and can operate semi-permanently. Hence, it has become widely-used in various applications.

Japanese Patent Laid-Open No. 2020-129312 discloses a management system which makes use of RFID for making progress management of construction work efficient. In the management system of Japanese Patent Laid-Open No. 2020-129312, RFID tags are installed at specific places and also attached to building materials. In such a situation, latest locations and statuses of the building materials are presented to a user based on information read from the RFID tags by a handy terminal.

Japanese Patent Laid-Open No. 2021-141415 discloses a technology that combines information reading from RFID tags with a self-localization technique in order to estimate a position of a management target without relying on global positioning system (GPS) positioning which is likely to become unstable in an environment with a lot of blocking objects. According to the technology of Japanese Patent Laid-Open No. 2021-141415, a position of a management target is estimated based on a known position of a position tag installed in a fixed manner and a relative amount of movement of a reading apparatus calculated in accordance with the self-localization technique (also referred to as pedestrian dead reckoning (PDR)).

Japanese Patent Laid-Open No. 2004-294403 discloses a technology that attaches an RFID tag to an item in advance from which identification information is received at different positions when the item is lost so that a position of the item is estimated using triangulation method based on received strengths and displayed on a screen.

Japanese Patent Laid-Open No. 2020-129312, Japanese Patent Laid-Open No. 2021-141415 and Japanese Patent Laid-Open No. 2004-294403 suggest visualizing information including an estimated position of a management target. Among others, a combination of information reading from RFID tags and the self-localization technique as in the technology of Japanese Patent Laid-Open No. 2021-141415 makes it possible to estimate positions of management targets scattered in a large space and provide a user with position information. However, the combination of information reading from RFID tags and the self-localization technique may be affected by some error factors such as effects of cumulative errors, spatial constraints of a real space, and information obsolescence over time.

SUMMARY

In light of the foregoing, some embodiments of the present disclosure aim to provide an improved mechanism for displaying information regarding positions of management targets.

According to an aspect, there is provided a display control system including a first wireless device configured to be attached to a management target that is movable in a real space, the first wireless device storing first identification information for identifying the management target; a second wireless device configured to be installed at a predetermined position in the real space, the second wireless device storing specific second identification information; a reading apparatus that is capable of reading, from the first wireless device and the second wireless device, identification information stored in either the first wireless device or the second wireless device; at least one processor; and at least one memory. The at least one processor and the at least one memory are configured to estimate a located position of the management target based on a result of reading the first identification information from the first wireless device at a first reading time by the reading apparatus and a result of reading the second identification information from the second wireless device at a second reading time by the reading apparatus, and cause a display apparatus to display an estimated area within which the management target is estimated to be located in the real space based on the located position. A magnitude of the estimated area is based on an amount of movement of the reading apparatus between the first reading time and the second reading time.

Further features of various embodiments will become apparent from the following description of exemplary embodiments (with reference to the attached drawings).

BRIEF DESCRIPTION OF THE DRAWINGS

FIG. 5 is an explanatory diagram illustrating an example of a configuration of a target table according to an embodiment.

FIG. 6 is an explanatory diagram illustrating an example of a configuration of a section table according to an embodiment.

FIG. 12 is an explanatory diagram illustrating an example of a configuration of a position information table according to an embodiment.

DESCRIPTION OF THE EMBODIMENTS

Figure 1:
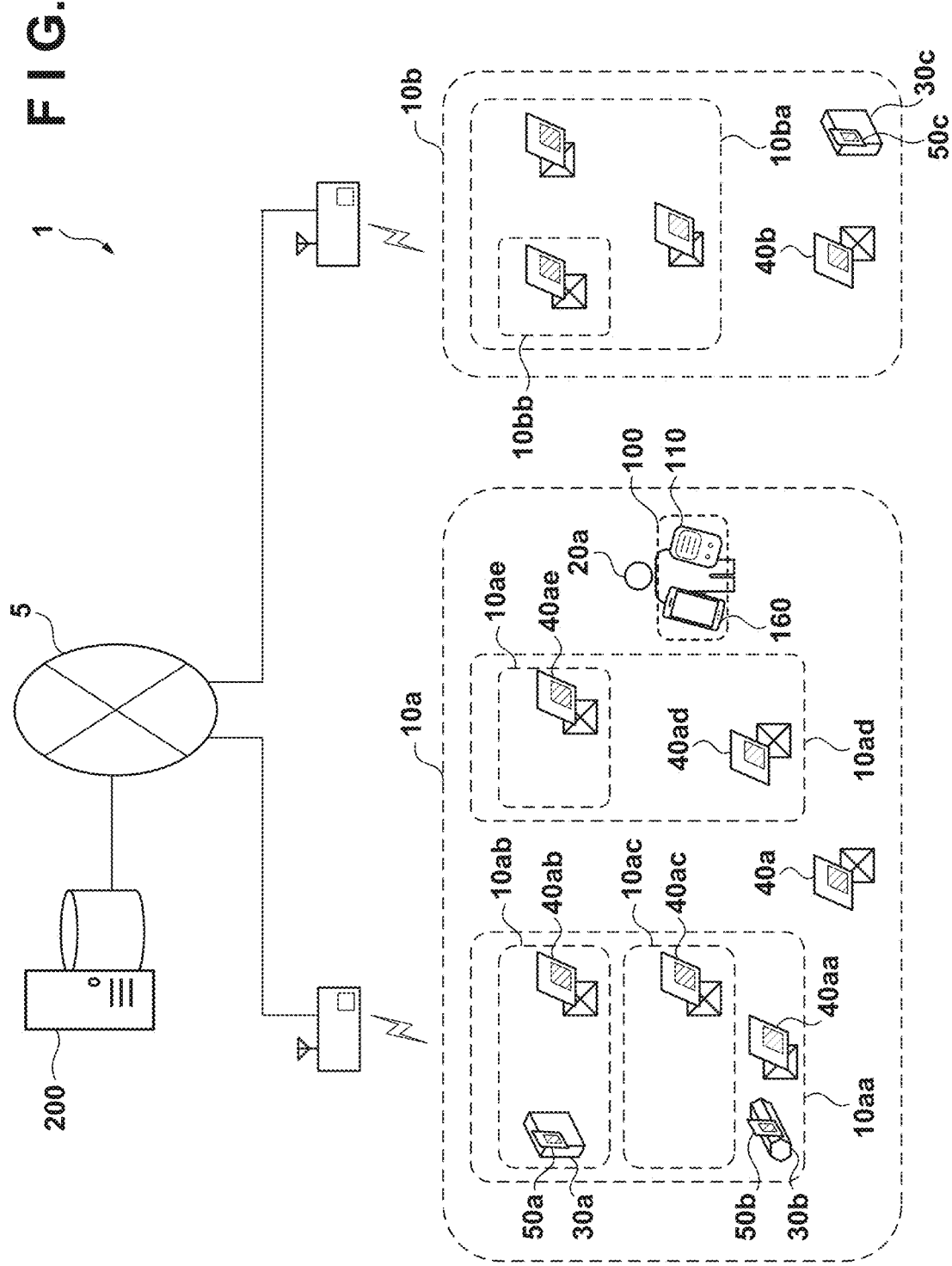
FIG. 1 is a schematic view illustrating an example of a configuration of a display control system according to an embodiment.

Hereinafter, embodiments will be described in detail with reference to the attached drawings. Note, the following embodiments are not intended to limit the scope of every embodiment. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

1. System Overview

FIG. 1 is a schematic view illustrating an example of a configuration of a display control system 1 according to an embodiment. The display control system 1 is a system that tracks positions of management targets, which may change day-to-day, and visualizes position information. In the present embodiment, it is assumed that the display control system 1 handles position information of management targets in order to assist management of works that involve movement of a management target in a real space. As an example, a work of constructing a building may include work processes, such as bringing materials to a site, distributing materials to floors or rooms, and installing materials, and at least one management target may move in each work process. Management targets may include at least one of items that are located in the real space and users that act in the real space. An item may be a non-living object (for example, a machine, equipment, a tool, a material, a consumable good, a component, a vehicle, or a robot) or living object (for example, an animal or a plant). In the following, an example of a work of constructing buildings is mainly described, however, the technology according to the present disclosure is also applicable to other types of works.

In the present embodiment, the display control system 1 estimates a located position of each management target, and manages position information that includes the estimation result. The located position of each management target may be represented by two-dimensional or three-dimensional positional coordinates. In addition, in the present embodiment, it is assumed that a plurality of sections are set in the real space. Each management target may be estimated to be located within any section based on the estimation result of the located position.

With reference to FIG. 1, a plurality of sections 10a, 10aa, 10ab, 10ac, 10ad, 10ae, 10b, 10ba, and 10bb are set in the real space. For example, the sections 10a and 10b may correspond to geographically mutually-separated sites (for example, different construction sites). The sections 10aa and 10ad are sections set inside the section 10a with a finer spatial granularity than the spatial granularity of the section 10a, and may correspond to separate buildings constructed in a certain site, for example. The sections 10ab and 10ac are sections set inside the section 10aa with a finer spatial granularity than the spatial granularity of the section 10aa, and may correspond to separate floors that constitute a certain building, for example. Similarly, the section 10ae is a section set inside the section 10ad with a finer spatial granularity than the spatial granularity of the section 10ad. Further sections that may correspond to rooms may be set in each floor with an even finer spatial granularity though they are not shown in FIG. 1. In this way, the plurality of sections set in the real space have tree-shaped hierarchical relationship, which is defined by the section data described below.

In the example of FIG. 1, the user 20a carries the portable system 100 with him or her while moving among the plurality of sections. Note that, in this specification, the expression that a user carries a certain target broadly encompasses various modes in which the user moves together with the target (for example, moves in a state where he or she holds or wears the target, etc.). Furthermore, there are items 30a, 30b and 30c which exist in the sections 10ab, 10aa, and 10b, respectively. These items are subject to the management of the position information by the display control system 1. In addition to the items, users (for example, workers, supervisors, and other related persons) may be management targets as well.

The display control system 1 makes use of wireless devices, which are also referred to as tags, in order to track positions of the management targets. A position tag is a wireless device (second wireless device) which is installed in each of the sections. Typically, a plurality of position tags are installed at different positions in the real space. In the figure, there is a position tag 40a installed in the section 10a, a position tag 40aa in the section 10aa, a position tag 40ab in the section 10ab, a position tag 40ac in the section 10ac, a position tag 40ad in the section 10ad, and a position tag 40ae in the section 10ae. Similarly, there is a position tag 40b installed in the section 10b. Two or more position tags may be installed in one section and, in the example of FIG. 1, there are two position tags installed in the section 10ba. Each position tag has specific identification information (second identification information) associated with a corresponding installation section stored in an internal memory.

A target tag is a wireless device (first wireless device) which is attached to each of the management targets that are movable in the real space. FIG. 1 shows a target tag 50a attached to the item 30a, a target tag 50b attached to the item 30b, and a target tag 50c attached to the item 30c. Each target tag has identification information (first identification information) stored in an internal memory for identifying the management target to which the target tag is attached.

Note that, in the following descriptions, the sections 10a to 10bb are collectively referred to as sections 10 by omitting the trailing alphabets from the reference signs when they do not need to be distinguished from each other. The same applies to the items 30 (items 30a, 30b, . . . ), the position tags 40 (position tags 40a, 40b, . . . ), the target tags 50 (target tags 50a, 50b, . . . ), and the user 20, as well as any other elements.

The number of sections set in a real space and the number of management targets are not limited to the example illustrated in FIG. 1, but may be any number. Similarly, the number of users who utilize the display control system 1 and the number of portable systems 100 carried by users described below may also be any number.

In the present embodiment, each of the tags, such as the position tags 40 and the target tags 50, is assumed to be a passive-type RFID tag (a passive tag). A passive tag is composed of a small integrated circuit (IC) chip with an embedded memory and an antenna, and has specific identification information for identifying the tag and some other information stored in the memory. In this specification, identification information is simply referred to as an ID, and identification information for identifying a tag is referred to as a tag ID. It should be noted that the tag ID may be considered as information for identifying an object to which the tag is attached. The IC chip of a passive tag operates by utilizing energy of an electromagnetic wave emitted from a tag reader, and modulates the information, such as the tag ID and some other information stored in the memory, into an information signal to transmit (send back) the information signal from the antenna.

It should be noted that, in another embodiment, each tag may be an active-type RFID tag. If each tag actively (for example, periodically) transmits information to its vicinity by utilizing power from a built-in battery, such a tag may be called a beacon tag. In a further embodiment, each tag may be a wireless device that sends back information in response to a signal from a reader in accordance with Near Field Communication (NFC) protocol or Bluetooth (registered trademark) protocol, for example. Each tag may have any name such as an IC tag, an IC card, or a responder.

The display control system 1 includes the portable system 100 and a management server 200. The portable system 100 and the management server 200 are connected to a network 5. The network 5 may be a wired network, a wireless network, or any combination thereof. Examples of the network 5 may include the Internet, an intranet, and a cloud network.

The portable system 100 includes at least a tag reader 110. The tag reader 110 is a reading apparatus that is capable of reading information stored in wireless devices, such as RFID tags. The tag reader 110 can detect a management target to which a target tag 50 is attached by reading a tag ID from the target tag 50, for example. The tag reader 110 attempts the reading operation periodically or in response to a certain trigger, such as a user operation, and transmits a tag reading result to the management server 200. The tag reader 110 may be capable of communicating with the management server 200 directly or indirectly via a certain relay apparatus (for example, a user terminal 160 described below). An example of a particular configuration of the tag reader 110 will be further described below.

In the example illustrated in FIG. 1, the portable system 100 further includes the user terminal 160. The user terminal 160 may be any type of terminal apparatus or an information processing apparatus such as a notebook personal computer (PC), a tablet PC, a smartphone, or a smart watch, for example. The user terminal 160 may be utilized for the display control system 1 to interact with a user 20. An example of a particular configuration of the user terminal 160 will be further described below.

The management server 200 is an information processing apparatus that manages position information of the management targets and other information in a database. The management server 200 may be implemented as an application server, a database server, or a cloud server by using a high-end general-purpose computer, for example. The management server 200 receives tag reading results from tag readers 110, and updates the database based on the received tag reading results. For example, the management server 200 estimates a located position of each management target based on tag reading results. An example of a particular configuration of the management server 200 will be further described below.

Though a single management server 200 is illustrated in FIG. 1, the functions of the management server 200, which will be described in detail below, may be provided by a single apparatus or by physically-separate multiple apparatuses that operate in conjunction with each other. In addition, though an example where the management server 200 maintains a database will be described in the present embodiment, an apparatus other than the management server 200 may maintain a part or all of the database. For example, a part of data may be maintained by a wireless device (for example, a position tag or a target tag), the tag reader 110, or the user terminal 160.

Note that FIG. 1 shows an example where the portable system 100 includes separate apparatuses, namely the tag reader 110 and the user terminal 160. However, the portable system 100 is not limited to this example. For instance, the tag reader 110 may have a part or all of the functions of the user terminal 160 described below, or the user terminal 160 may have a part or all of the functions of the tag reader 110 described below. Moreover, the functions of the management server 200 described in the present embodiment may be realized within the user terminal 160.

Figure 2:
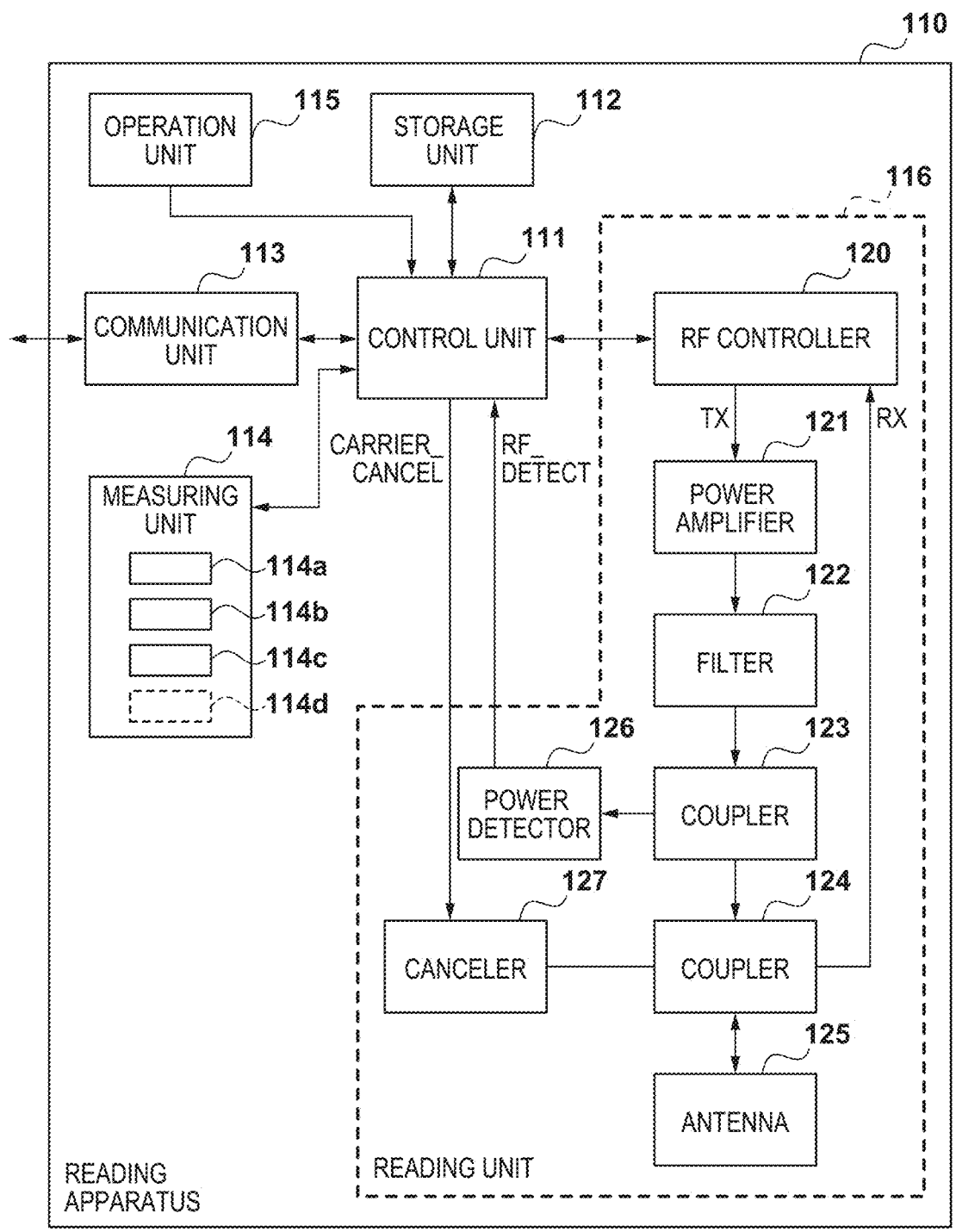
FIG. 2 is a block diagram illustrating an example of a configuration of a tag reader included in a portable system according to an embodiment.

2. Configuration Example of Portable System 2-1. Configuration Example of Tag Reader FIG. 2 is a block diagram illustrating an example of a configuration of the tag reader 110 included in the portable system 100 according to an embodiment. With reference to FIG. 2, the tag reader 110 comprises a control unit 111, a storage unit 112, a communication unit 113, a measuring unit 114, an operation unit 115, and a reading unit 116.

The control unit 111 consists of a memory to store computer programs, and one or more processors (for example, central processing units (CPUs)) to execute the computer programs. The control unit 111 controls overall functionality of the tag reader 110 described in this specification. For example, the control unit 111 causes the reading unit 116 to perform reading from an RFID tag within a tag reading range, and causes the storage unit 112 to temporarily store the read information, the time of the reading, and the received signal level as reading result data. In parallel to the reading from RFID tags, the control unit 111 also causes the measuring unit 114 to measure the position of the tag reader 110, and the storage unit 112 to store a measurement result. Then, the control unit 111 transmits, to the management server 200 via the communication unit 113, the reading result data and the measurement result data stored in the storage unit 112 together with the reader identification information (also referred to as a reader ID) of the local apparatus.

The storage unit 112 may include any kind of storage medium, such as a semiconductor memory (a read only memory (ROM), a random access memory (RAM), or the like), an optical disk, or a magnetic disk, for example. In the present embodiment, the storage unit 112 stores the above-described reading result data, measurement result data, and the reader ID of the tag reader 110.

The communication unit 113 is a communication interface for the tag reader 110 to communicate with the management server 200. For example, the communication unit 113 may be a wireless local area network (WLAN) interface that communicates with a WLAN access point, or a cellular communication interface that communicates with a cellular base station. Also, the communication unit 113 may be a connection interface (e.g., a Bluetooth® interface, a universal serial bus (USB) interface) for connection with a relay apparatus.

The measuring unit 114 is a unit that is capable of measuring a position of the tag reader 110. In the present embodiment, the measuring unit 114 uses the self-localization technique, also referred to as PDR, to periodically measure a relative amount of movement of the tag reader 110 from a certain reference position, and outputs the measured amount of movement to the control unit 111. The reference position of measurement of the relative amount of movement may be, for example, the position of the tag reader 110 at the time of being activated. The relative amount of movement of the tag reader 110 may be treated as a relative position. For example, the measuring unit 114 may include a three-axis acceleration sensor 114a, a gyro sensor 114b, and a geomagnetic sensor 114c. The three-axis acceleration sensor 114a measures acceleration applied to the tag reader 110 in the device coordinate system that is specific to the tag reader 110, and outputs first sensor data. The gyro sensor 114b measures an angular speed of the tag reader 110, that is a change in attitude of the tag reader 110, and outputs second sensor data. The geomagnetic sensor 114c measures an orientation of the tag reader 110 in the real space, and outputs third sensor data. The measuring unit 114 can measure the relative amount of movement of the tag reader 110 based on these pieces of sensor data by converting the direction of the acceleration of the tag reader 110 into a direction in a coordinate system of the real space to integrate the converted acceleration. The relative amount of movement of the tag reader 110 output from the measuring unit 114 to the control unit 111 may be a two-dimensional vector in a horizontal plane, or a three-dimensional vector that includes a component of height direction as well.

As described below, in the present embodiment, the positional coordinates of the installation position of each position tag 40 are known and registered in a database. Therefore, the positional coordinates of the point at which the tag reader 110 is currently positioned can be estimated based on the relative amount of movement of the tag reader 110 from the point in time where it detected a position tag 40 to the current point in time, and the known positional coordinates of that position tag 40. In the present embodiment, an example where the management server 200 estimates an absolute position of the tag reader 110 is mainly described, however, the control unit 111 or the measuring unit 114 of the tag reader 110 may access the database to estimate the absolute position of the tag reader 110.

Note that the portable system 100 may include a measuring apparatus (which is capable of measuring a relative amount of movement using the self-localization, for example) separately from the tag reader 110, instead of the tag reader 110 including the measuring unit 114.

In an another example, the measuring unit 114 may further include an air pressure sensor 114d indicated by a dashed line in FIG. 2. The air pressure sensor 114d measures the atmospheric pressure, and outputs air pressure data indicating the measured value to the control unit 111. In this example, the air pressure data output from the air pressure sensor 114d may be utilized for estimating the height of the point at which the tag reader 110 is currently positioned. For example, with a linear air pressure to height model, a relative height of a current position from a reference position can be derived by multiplying an amount of descent of the air pressure value at the current position from the air pressure value at the reference point by a predetermined coefficient. In a case where the reference point is set up on the ground, the relative height represents an altitude of the current position above the ground. An air pressure sensor to measure the atmospheric pressure at the reference point may be additionally deployed.

The operation unit 115 receives an operation by the user 20. The operation unit 115 includes physical input devices, such as a button, a switch, or a lever, disposed on a housing of the tag reader 110, for example. The operation unit 115 receives an operation by the user 20 through an input device, and outputs an operation signal to the control unit 111. In addition, the operation unit 115 may include an audio input interface, such as a microphone.

The reading unit 116 is a unit that is capable of reading, from each of the position tags 40 and the target tags 50 under management in the display control system 1, information stored in the tag. With reference to FIG. 2, the reading unit 116 includes an RF controller 120, a power amplifier 121, a filter 122, a first coupler 123, a second coupler 124, an antenna 125, a power detector 126, and a canceler 127. The RF controller 120 outputs a transmission signal (for example, a signal modulated in the UHF band) from a TX terminal to the power amplifier 121 in accordance with control by the control unit 111. The power amplifier 121 amplifies the transmission signal input from the RF controller 120 to output it to the filter 122. The amplification rate of the transmission signal here may be controllable in variable manner, and a higher amplification rate will enhance an output strength of an electromagnetic wave emitted from the tag reader 110. The filter 122 may be a low-pass filter, for example, and filters out unnecessary frequency components from the transmission signal amplified by the power amplifier 121. The first coupler 123 distributes the transmission signal that has passed the filter 122 to the second coupler 124 and the power detector 126.

The second coupler 124 outputs the transmission signal input from the first coupler 123 to the antenna 125, and outputs a received signal input from the antenna 125 to the RF controller 120. The antenna 125 transmits the transmission signal input from the coupler 124 to the air as an electromagnetic wave. Further, the antenna 125 receives a signal that has been sent back from an RFID tag that exists within the reading range of the tag reader 110 in response to the transmission signal, and outputs the received signal to the coupler 124. The power detector 126 detects a power level of the signal input from the first coupler 123, and outputs a signal 'RF_DETECT' indicative of the detected power level to the control unit 111. The canceler 127 receives a signal 'CARRIER_CANCEL' indicative of a power level of a carrier from the control unit 111. Then, the canceler 127 extracts an intended signal component of the received signal to be output to an RX terminal of the RF controller 120 by canceling the carrier component of the transmission signal based on the CARRIER_CANCEL. The RF controller 120 demodulates the signal input from the RX terminal to obtain a tag ID and other information sent back from the RFID tag, and outputs the obtained information to the control unit 111. The RF controller 120 also measures a reception level (also referred to as received strength) of the signal input from the RX terminal, and outputs the measurement result to the control unit 111.

In the present embodiment, the reading unit 116 can attempt tag reading periodically (for example, once per second) without requiring any explicit command from a user. Data transmission from the communication unit 113 to the management server 200 can also be performed periodically (for example, every few seconds) or whenever the tag reading is done without requiring any explicit command from a user. The control unit 111 may exclude, from the data to be transmitted, the same record as the most recent record that has already been transmitted in a predetermined time period to omit redundant data transmission and reduce a communication load. Noted that, in another embodiment, one or both of an attempt of tag reading by the reading unit 116 and data transmission to the management server 200 may be performed in response to detecting a user input via the operation unit 115. In a case where the communication unit 113 performs communication with the management server 200 indirectly via a relay apparatus, the data transmission to the management server 200 may be performed only while there is an effective connection between the communication unit 113 and the relay apparatus.

2-2. Configuration Example of User Terminal

Figure 3:
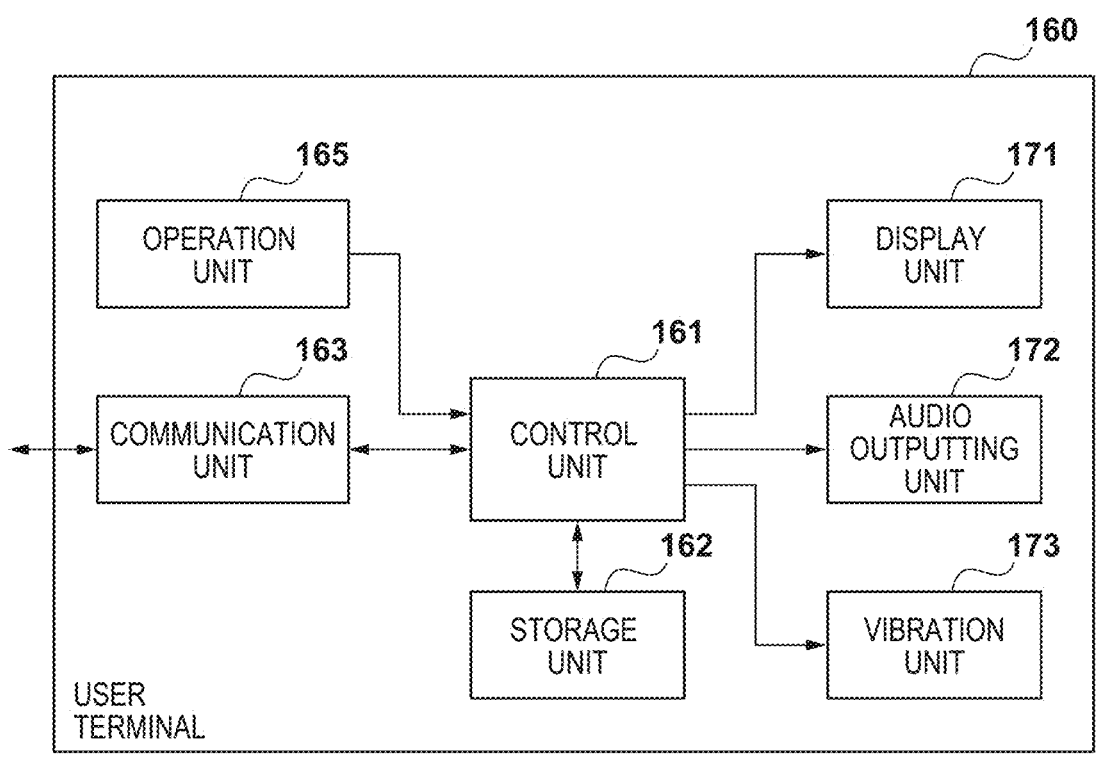
FIG. 3 is a block diagram illustrating an example of a configuration of a user terminal included in the portable system according to an embodiment.

FIG. 3 is a block diagram illustrating an example of a configuration of the user terminal 160 included in the portable system 100 according to an embodiment. With reference to FIG. 3, the user terminal 160 includes a control unit 161, a storage unit 162, a communication unit 163, an operation unit 165, a display unit 171, an audio outputting unit 172 and a vibration unit 173.

The control unit 161 consists of a memory to store computer programs, and one or more processors to execute the computer programs. The processor may be a CPU or an integrated circuit (IC), such as a microcontroller (for example, one-chip microcontroller). The control unit 161 controls overall functionality of the user terminal 160 described in this specification. For example, when the user 20 desires to browse position information of a management target in the display control system 1, the control unit 161 causes the display unit 171 to display a screen that presents the requested information. Some examples of screens displayed to the user 20 will further be described below.

The storage unit 162 may include any kind of storage medium, such as a semiconductor memory (ROM, RAM, or the like), an optical disk, or a magnetic disk, for example. In the present embodiment, the storage unit 162 temporarily stores map image and position information of management targets received from the management server 200 described below for the purpose of screen display, for example.

The communication unit 163 is a communication interface for the user terminal 160 to communicate with the management server 200. For example, the communication unit 163 may be a WLAN interface or a cellular communication interface. The user terminal 160 may further comprise a connection interface (e.g., a Bluetooth® interface, a universal serial bus (USB) interface) for connection with peripheral equipment, though it is not shown in FIG. 3.

The operation unit 165 receives operations and information inputs from the user 20. The operation unit 165 includes input devices, such as a touch sensor, a key pad, a keyboard, a button, or a pointing device, for example. The operation unit 165 receives an operation by the user 20 through an input device, and outputs an operation signal to the control unit 161. In addition, the operation unit 165 may further include some other types of input devices, including an audio input interface such as a microphone, a sensor to detect a vibration, or the like.

The display unit 171 displays an image and information. The display unit 171 may be a liquid crystal display or an organic light emitting diode (OLED) display, for example. The audio outputting unit 172 outputs audio. The audio outputting unit 172 may be a speaker, for example. The vibration unit 173 vibrates the user terminal 160. The vibration unit 173 may be a vibrator including an eccentric motor, for example.

3. Configuration Example of Management Server 3-1. Basic Configuration

Figure 4:
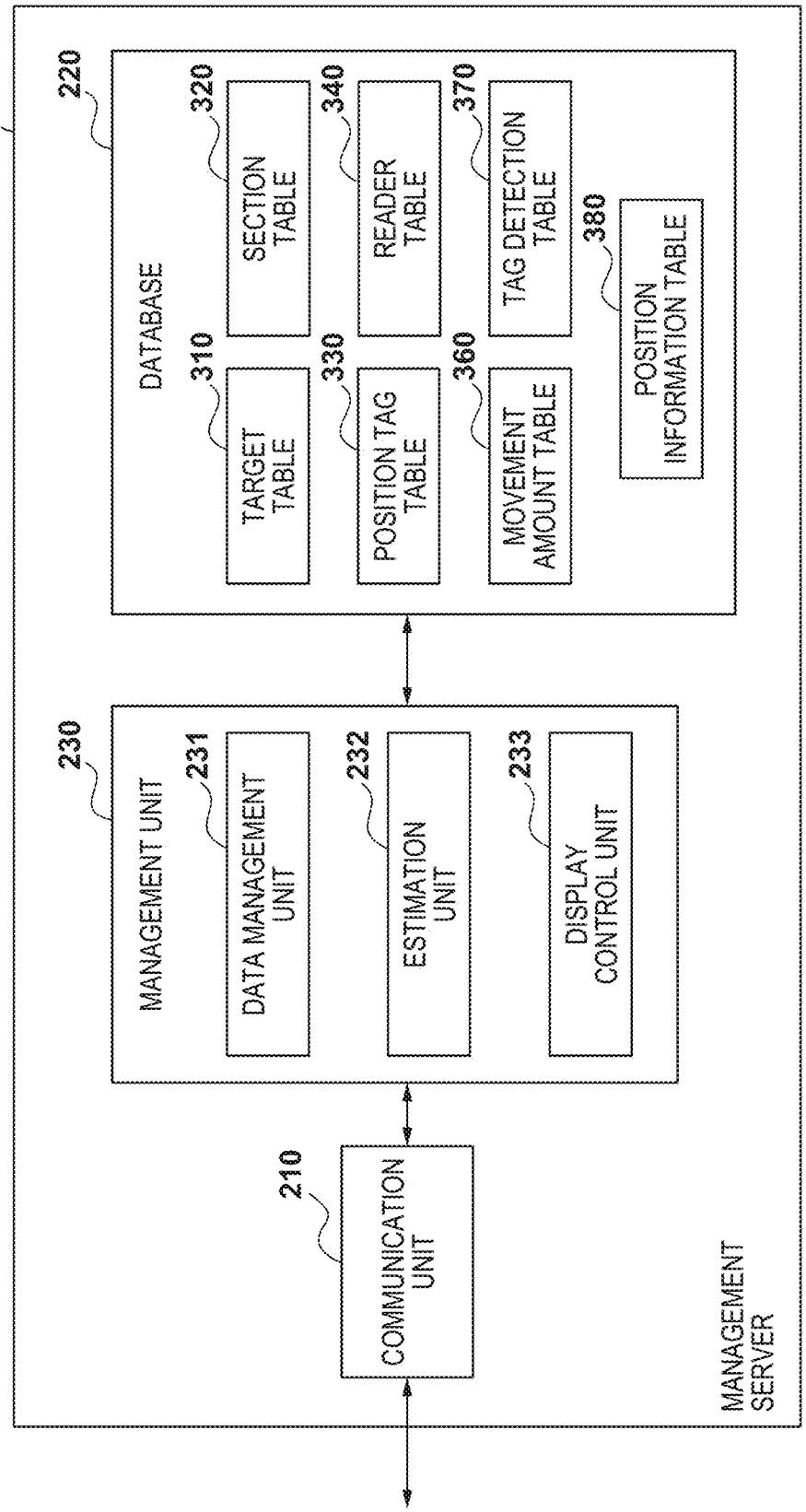
FIG. 4 is a block diagram illustrating an example of a configuration of a management server according to an embodiment.

FIG. 4 is a block diagram illustrating an example of a configuration of the management server 200 according to an embodiment. With reference to FIG. 4, the management server 200 includes a communication unit 210, a database (DB) 220, and a management unit 230.

The communication unit 210 is a communication interface for the management server 200 to communicate with other apparatuses. The communication unit 210 may be a wired communication interface or a wireless communication interface. In the present embodiment, the communication unit 210 communicates with the portable system 100 (for example, one or both of the tag reader 110 and the user terminal 160). The database 220 stores various data for estimation of positions of management targets and management of position information. The database 220 is accessible by the management unit 230. In the present embodiment, the database 220 includes a target table 310, a section table 320, a position tag table 330, a reader table 340, a movement amount table 360, a tag detection table 370, and a position information table 380. The management unit 230 is a set of software modules that perform various processing related to position estimation and provision of position information to users. The individual software modules can run by one or more processors (not shown) of the management server 200 executing computer programs stored in a memory (not shown). In the present embodiment, the management unit 230 includes a data management unit 231, an estimation unit 232, and a display control unit 233.

3-2. Data Management (1) Target Table

FIG. 5 illustrates an example of a configuration of the target table 310. The target table 310 has four data elements, namely, Tag ID 311, Target ID 312, Name 313, and Target Type 314. Tag ID 311 is identification information that uniquely identifies a target tag 50 attached to each of the management targets. The value of Tag ID 311 is the same as the value of the tag ID stored within the corresponding target tag 50. Target ID 312 is identification information that uniquely identifies each management target. Name 313 represents a name of each of the management targets. In the example of FIG. 5, the management target identified by a target ID 'IT11' is given a name of 'Material A1'. Target Type 314 is a mode of type information associated with a management target. In the example of FIG. 5, 'Material A1' and 'Material A2' are classified as the same target type 'T1' whereas 'Material B1' is classified as a target type 'T2' that is different from the target type 'T1'

(2) Section Table

Figure 9A:
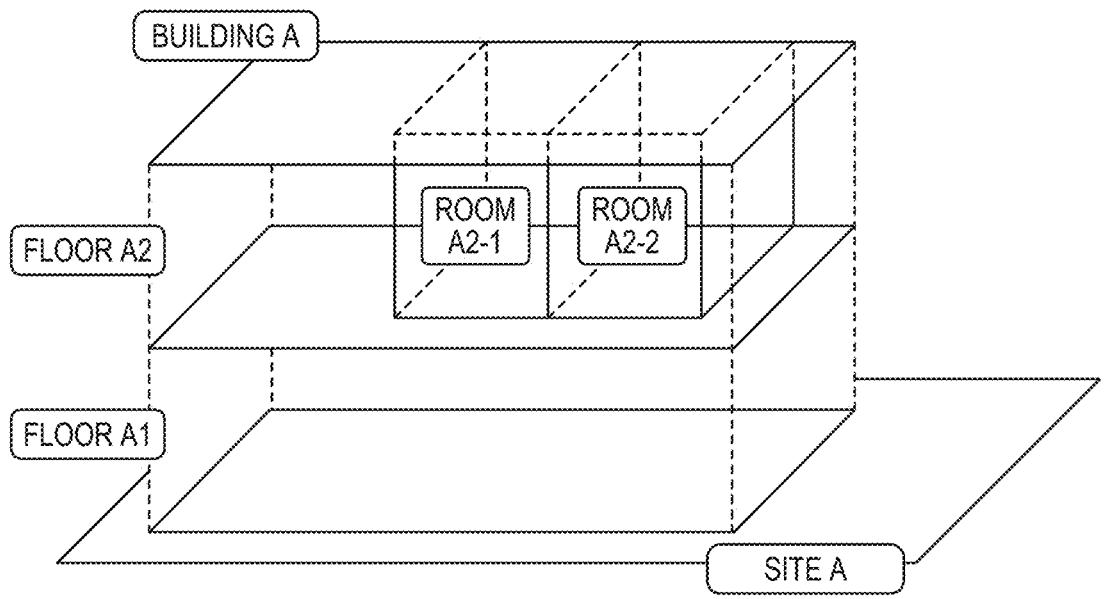
FIG. 9A is a schematic view schematically illustrating an example of section settings corresponding to the data example of FIGS. 6 and 7.

FIG. 6 illustrates an example of a configuration of the section table 320 of the database 220. The section table 320 contains section data that defines a plurality of sections set in the real space. The section table 320 has six data elements, namely, Section ID 321, Name 322, Parent Section 323, Map 325, Scale 326, and Orientation 327. Section ID 321 is identification information that uniquely identifies each of the plurality of sections. Name 322 represents a name of each section. In the example of FIG. 6, the section identified by a section ID 'A000' is given a name of 'Site A'. Parent Section 323 identifies the section that directly encompasses each section in the hierarchical relationship of the multiple sections set in the real space by a value of Section ID 321 of another record in the section table 320. In the example of FIG. 6, the parent section of the section identified by a section ID 'AA00' has a value of 'A000', which means that 'Building A' is encompassed by 'Site A'. Parent Section 323 may be blank for the topmost section in the hierarchical relationship of the multiple sections. Map 325 is a data element for storing map data in association with a corresponding section when the available map data for each section is registered by a user. The map data includes at least image data that represents a map image. In addition, the map data may include boundary data that defines a boundary position of the sections. Scale 326 represents a ratio for converting a distance on the map image into a distance in the real space (for example, how many meters in the real space that one pixel of the image corresponds to) when there is registered map data. Orientation 327 is a data element for storing orientation information that indicates the orientation on the map image when there is registered map data. For example, the orientation information may include a vector that points in a specific direction (for example, north) in the two-dimensional coordinates of the map image. FIG. 9A schematically illustrates an example of positional relationship between sections which belong to 'Site A' from among the sections defined by the section data illustrated in FIG. 6.

(3) Position Tag Table

Figure 7:
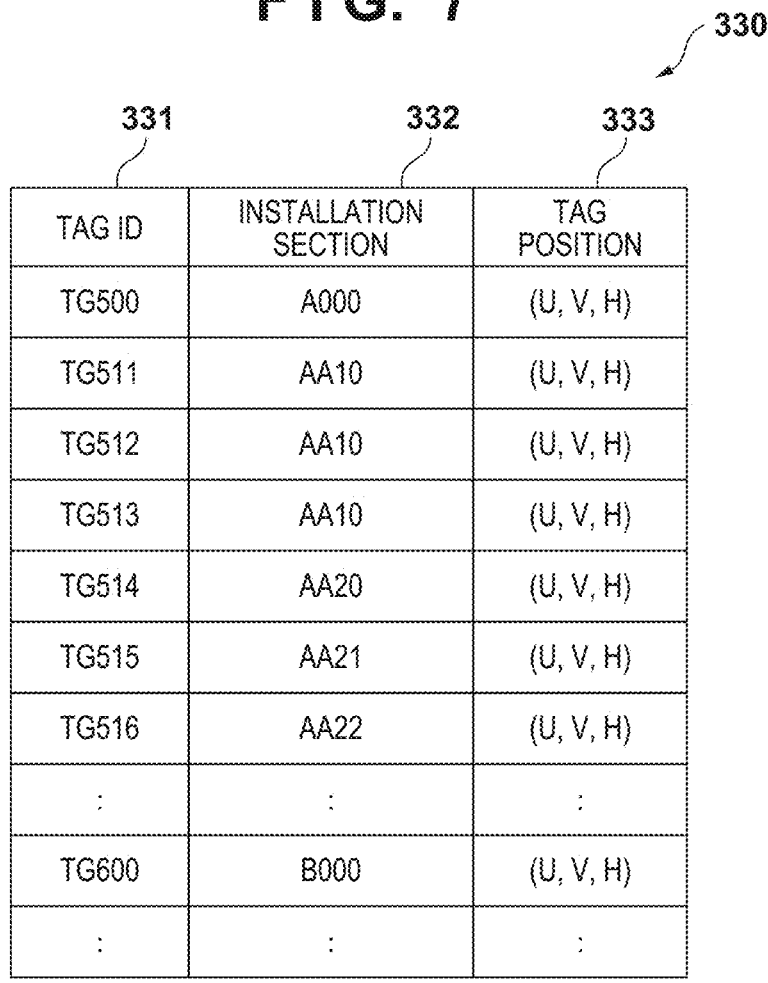
FIG. 7 is an explanatory diagram illustrating an example of a configuration of a position tag table according to an embodiment.

FIG. 7 illustrates an example of a configuration of the position tag table 330 of the database 220. The position tag table 330 has three data elements, namely, Tag ID 331, Installation Section 332, and Tag Position 333. Tag ID 331 is identification information that uniquely identifies each of the position tags 40 installed in the real space. The value of Tag ID 331 is the same as the value of the tag ID stored within the corresponding position tag 40. Installation Section 332 identifies the section in which each position tag 40 is installed by a value of Section ID 321 in the section table 320. That is, the tag ID of each position tag 40 is associated with an installation section corresponding to the position tag 40 in the position tag table 330. With reference to FIG. 7, the tag ID 'TG500' is associated with the section ID 'A000', for example. This represents that the position tag 40 identified by the tag ID 'TG500' is installed in the section identified by the section ID 'A000'. Tag Position 333 represents the positional coordinates of the position at which each position tag 40 is installed.

Figure 9B:
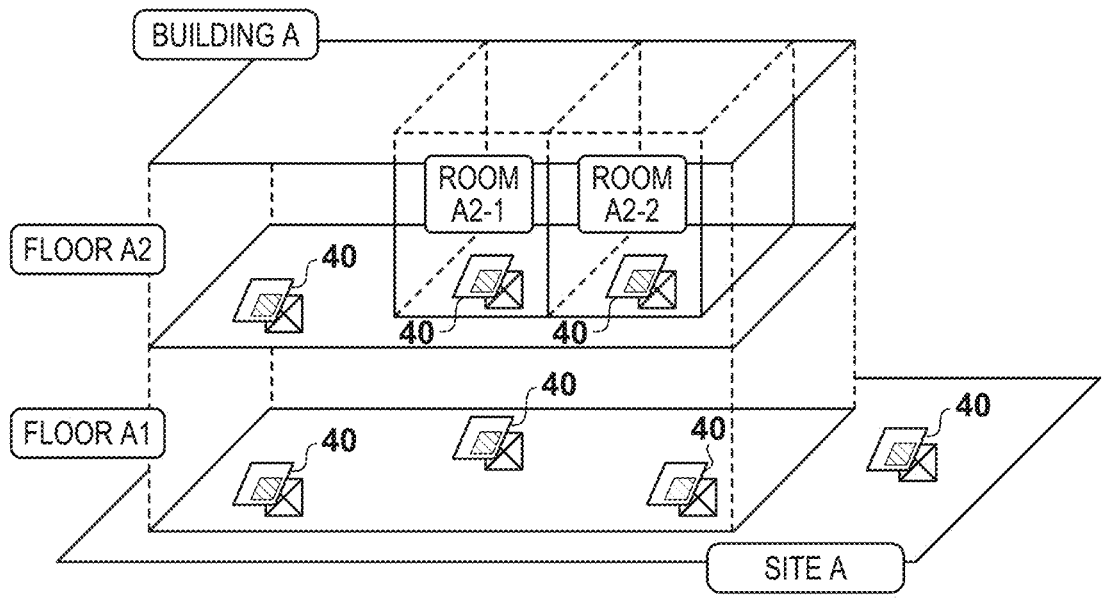
FIG. 9B is a schematic view schematically illustrating an example of position tag arrangement corresponding to the data example of FIGS. 6 and 7.

FIG. 9B schematically illustrates an example of an arrangement of position tags 40 corresponding to the data example of the position tag table 330 of FIG. 7 assuming the positional relationship of the sections illustrated in FIG. 9A. In buildings like the one illustrated in the figure, walls, floors and ceilings often block wireless signals. By having a position tag 40 installed in each of sections divided from one another by such blocking objects, it is possible to determine in which section the tag reader 110 is located at the time of tag detection based on which one of the position tags 40 the tag reader 40 has detected. The present embodiment combines such simple determination of a located section based on tag reading with finer position estimation using the self-localization technique described below. For a relatively large section, two or more position tags 40 may be set in a single section as with the case of 'Floor A1' of FIG. 9B because a detectable range of one position tag 40 sometimes does not cover a sufficient area.

(4) Reader Table

Figure 8:
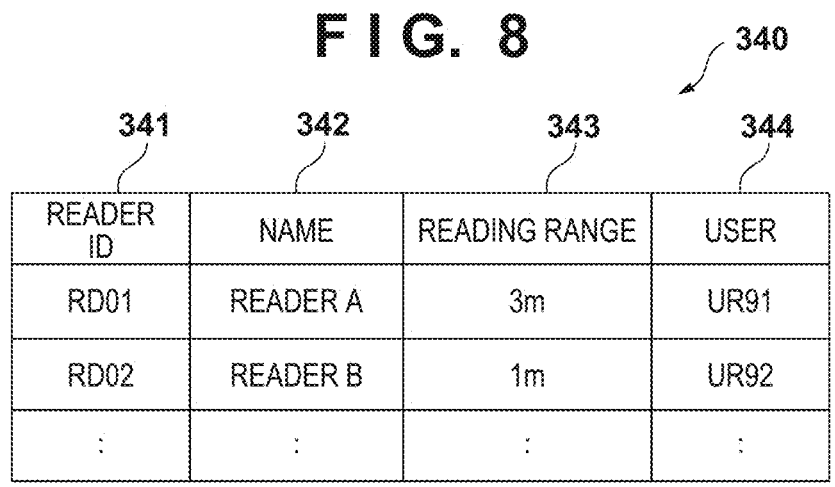
FIG. 8 is an explanatory diagram illustrating an example of a configuration of a reader table according to an embodiment.

FIG. 8 illustrates an example of a configuration of the reader table 340. The reader table 340 has three data elements, namely, Reader ID 341, Name 342, Reading Range 343, and User 344. Reader ID 341 is identification information that uniquely identifies each of the tag readers 110 utilized in the system. Name 342 represents a name of each reader. Reading Range 343 represents a length of a reading range as a performance of each reader (how far away a tag ID can be read from a wireless device). Note that the reader table 340 may not include the data element Reading Range 343 in a case where the reading ranges of all of the tag readers 110 have equal length. User 344 is identification information that identifies a user 20 who utilizes each tag reader 110. In the example of FIG. 8, the tag reader 110 identified by the reader ID 'RD01' has the name of 'Reader A' and is utilized by a user identified by the user ID 'UR91'.

(5) Data Registration

The data management unit 231 manages various data stored in the database 220 described above. The data registered in each table of the database 220 may be generated by a user or an engineer, for example. The data management unit 231 may receive a data file in which such data is described via the communication unit 210 and register the data in each table. The map data of each section may be data based on computer-aided design (CAD) drawings, for example. The data management unit 231 may provide the user terminal 160 with a user interface (UI) for accepting data registration, modification, and deletion, for example.

A configuration of the database managed by the management server 200 is not limited to the configuration described here. Two or more of the tables illustrated in FIG. 4 may be merged into a single table, and one of the tables may be divided into two or more tables. Each table may include additional data elements, and may not include one or more of the described data elements. For example, the target table 310 may include additional data elements, such as those for manufacturers and owners of items serving as management targets and for organizations to which users belong. The section table 320 may include a data element indicating an altitude of each floor. The section table 320 may also include a data element indicating an elevation of the ground surface of each site or each building. This altitude or elevation may be utilized, for example, when deriving the height of a point at which a certain management target is located from a measurement value of air pressure.

3-3. Estimation of Located Position

The estimation unit 232 estimates a located position of a management target to which a target tag 50 is attached based on a result of reading a tag ID from the target tag 50 by a tag reader 110 and a result of reading a tag ID from a position tag 40 by the same tag reader 110. Typically, the estimation unit 232 estimates located positions of a plurality of management targets that are movable in the real space. The movement amount table 360 and the tag detection table 370 of the database 220 are utilized for such estimation of located positions.

(1) Movement Amount Table

Figure 10:
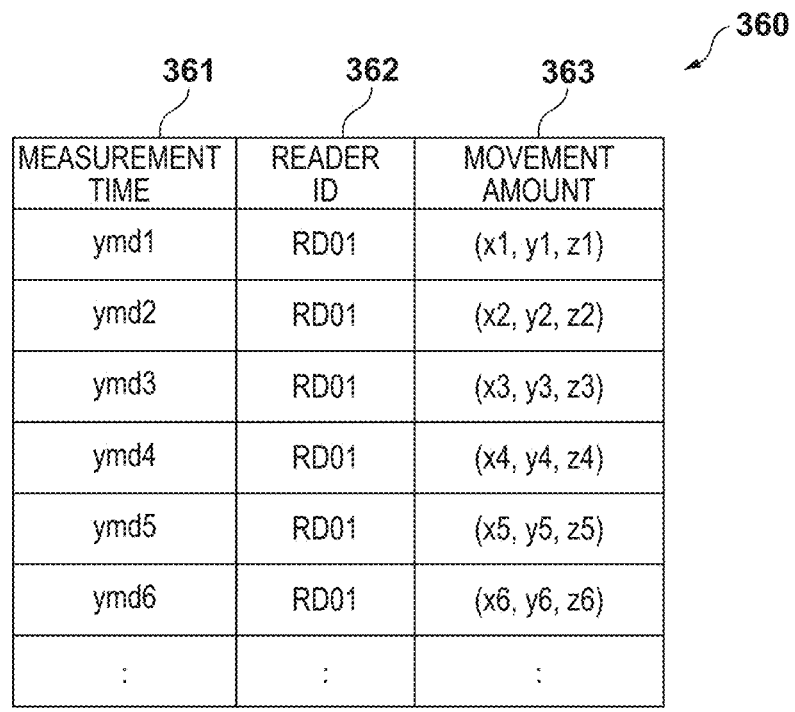
FIG. 10 is an explanatory diagram illustrating an example of a configuration of a movement amount table according to an embodiment.

FIG. 10 illustrates an example of a configuration of the movement amount table 360. The movement amount table 360 is a table for accumulating records of measurement result data received from tag readers 110 (hereinafter referred to as measurement result records). The movement amount table 360 has three data elements, namely, Measurement Time 361, Reader ID 362, and Movement Amount 363. Measurement Time 361 indicates a time at which measurement was performed for the measurement result indicated by each measurement result record. Reader ID 352 indicates a tag reader 110 that has performed the measurement for the measurement result indicated by each measurement result record by a value of Reader ID 341 of the reader table 340. In the example of FIG. 10, six records in the movement amount table 360 indicate the results of movement amount measurements that have been performed by the tag reader 110 that is identified by the reader ID "RD01", at six different times "ymd1" to "ymd6". Movement Amount 363 represents a relative amount of movement as a measurement result. Herein, Movement Amount 363 represents the relative amount of movement in the form of a three-dimensional vector in a real-space coordinate system.

(2) Tag Detection Table

Figure 11:
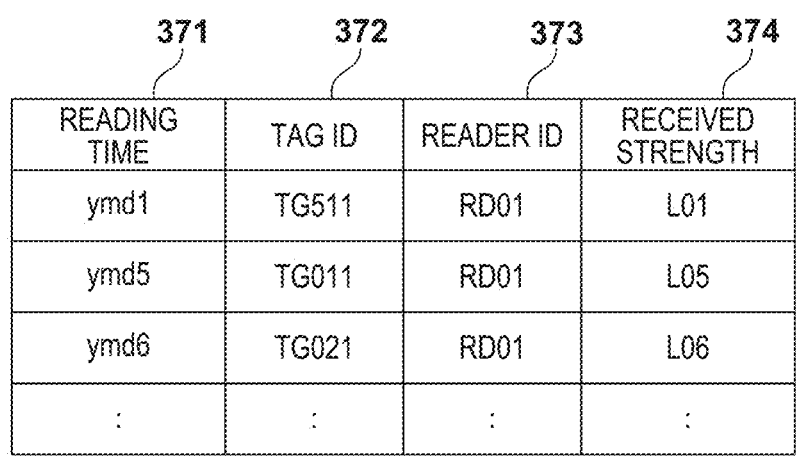
FIG. 11 is an explanatory diagram illustrating an example of a configuration of a tag detection table according to an embodiment.

FIG. 11 illustrates an example of a configuration of the tag detection table 370. The tag detection table 370 is a table for accumulating records of reading result data received from the tag readers 110 (hereinafter referred to as reading result records). The tag detection table 370 has four data elements, namely, Reading Time 371, Tag ID 372, Reader ID 373, and Received Strength 374. Reading Time 371 represents a time at which a tag ID was read for each reading result record. Tag ID 372 represents the tag ID that has been read for each reading result record. Reader ID 373 indicates a tag reader 110 that has performed the tag reading for each reading result record by a value of Reader ID 341 of the reader table 340. In the example of FIG. 11, the first record in the tag detection table 370 indicates that the tag reader 110 identified by the reader ID "RD01" read the tag ID "TG511" (for example, the tag ID of the position tag 40 on "Floor A1") at time "ymd1". The second record indicates that the tag reader 110 read the tag ID "TG011" (for example, the tag ID of the item tag 50 of "Material A1") at time "ymd5". The third record indicates that the tag reader 110 read the tag ID "TG021" (for example, the tag ID of the item tag 50 of "Material B1") at time "ymd6". Received Strength 374 represents a reception level of a signal received by the tag reader 110 at the time of the tag reading for each reading result record.

(3) Estimation of Located Position

Assume that a certain tag reader 110 has read a tag ID from a certain target tag 50 at a first reading time, and has furthermore read a tag ID from a certain position tag 40 at a second reading time. The second reading time may be before or after the first reading time. The estimation unit 232 can estimate positional coordinates of a point where a management target with the detected target tag 50 attached thereto is located based on the relative amount of movement of that tag reader 110 between the first reading time and the second reading time, and the known position of the detected position tag 40.

More specifically, the estimation unit 232 adds, to the movement amount table 360, each record of the measurement result data received from the portable system 100 via the communication unit 210 as a measurement result record. In addition, the estimation unit 232 adds, to the tag detection table 370, each record of the reading result data received from the portable system 100 via the communication unit 210 as a reading result record. If a target tag 50 has been detected by the tag reader 110, the estimation unit 232 can estimate the positional coordinates (u,v,h) of the point where the target tag 50 is located at that point in time according to the following equation (1):

$$(u, v, h) = (U_0 + (X - X_0), V_0 + (Y - Y_0), H_0 + (Z - Z_0)) \quad (1)$$

where (X,Y,Z) denotes the amount of movement of the tag reader 110 at the first reading time, and $(X_0, Y_0, Z_0)$ denotes the amount of movement of the tag reader 110 at the second reading time. The second reading time is the time at which the tag ID is read from a position tag selected as a reference for the estimation (hereinafter, referred to as "reference position tag"). $(U_0, V_0, H_0)$ denotes the known positional coordinates of the installation position of the reference position tag. Note that in the variation described above, a height direction component H may be derived by applying a measured value of the atmospheric pressure to a relational expression representing an air pressure-to-height model, rather than using the above-described equation.

If the same target tag 50 has been detected a plurality of times in a certain period, the estimation unit 232 may estimate the positional coordinates of the corresponding management target based on the relative amount of movement of the tag reader 110 at the point in time when the received strength of the signal was the highest. Also, if the same target tag 50 has been detected a plurality of times in a certain period, the estimation unit 232 may estimate that the corresponding management target is positioned at the center of the plurality of detected positions derived through the above-described equation (e.g., a center of gravity position).

Based on correlation between a result of reading a tag ID from a target tag 50 of a certain management target and results of reading tag IDs from one or more position tags 40, the estimation unit 232 may select the reference position tag to be used in the estimation of the located position of that management target. The correlation herein may include one or both of a temporal correlation and a spatial correlation. For example, focusing on each position tag 40 in order from the smallest difference in reading times of tag IDs with respect to a certain target tag 50, the estimation unit 232 may select, as the reference position tag, a position tag 40 that satisfies both the following conditions I and II for the first time:

Condition I: a linear distance between the estimated positions of the tag reader at two reading times is less than a first threshold (separate threshold-based determinations may be made for a distance within a horizontal plane and a distance in the height direction);

Condition II: a cumulative amount of movement of the tag reader between the two reading times is less than a second threshold.

The estimation unit 232 estimates that the corresponding management target is located in the section associated with the tag ID of the reference position tag selected in accordance with the conditions described above. That is, a value of Installation Section 332 in the position tag table 330 of a reference position tag selected for a target tag 50 of a certain management target identifies the located section of that management target. Note that, for a management target for which a reference position tag cannot be selected due to there being no position tag 40 satisfying the conditions described above, the estimation unit 232 may determine that its located position is unknown.

The estimation unit 232 further derives an estimation error for the management target of which the located position has been estimated. The estimation error is used for determining an estimated area within which the management target is estimated to be located in the real space. The estimation error depends on an amount of movement of the tag reader 110 between the first reading time and the second reading time. The amount of movement herein is a cumulative amount of movement along a movement path of the tag reader 110 as with the case of the above-described condition II. That is, in a case where the tag reader 110 moves non-linearly between a first position at the first reading time and a second position at the second reading time, the cumulative amount of movement is larger than the linear distance between the first position and the second position. Specifically, assume that the amount of movement of the tag reader 110 has been measured K times with a certain measurement periodicity (K is equal to or larger than two), and the k-th measurement result (k=1, . . . , K) is denoted by $M_k$. $M_k$ is a two-dimensional or three-dimensional vector. The estimation unit 232 may derive the cumulative amount of movement $Z_{T1 \to T2}$ of the tag reader 110 between the first reading time T1 and the second reading time T2 in accordance with the following equation (2), for example:

$$Z_{T1 \to T2} = \sum_{k=2}^{K} |M_k - M_{k-1}| \qquad (2)$$

Equation (2) describes that the cumulative amount of movement $Z_{T1 \to T2}$ is derived by summing absolute values of relative amounts of movement in multiple measurement periods between the first reading time T1 and the second reading time T2. The estimation unit 232 may further derive the estimation error $E_{T1 \to T2}$ of the located position of the management target in accordance with the following equation (3):

$$E_{T1 \to T2} = \alpha \cdot Z_{T1 \to T2} \qquad (3)$$

where $\alpha$ is a predetermined coefficient that is multiplied with the cumulative amount of movement $Z_{T1 \to T2}$. For example, in a case where an error of PDR accumulated during ten meters (m) movement of the tag reader 110 is evaluated to be approximately one meter, the coefficient $\alpha$ may be set to 0.1. The coefficient $\alpha$ may be treated as a ratio of the error to the cumulative amount of movement. The value of the coefficient may be determined taking the measurement performance of the measuring unit 114 of the tag reader 110 into account in advance.

The estimation unit 232 derives a located position and some other information for each management target in this manner, and adds a position information record indicating the outcome to the position information table 380.

(4) Position Information Table

FIG. 12 illustrates an example of a configuration of the position information table 380. The position information table 380 is a table for accumulating position information for various management targets under the management of the display control system 1. The position information table 380 has seven data elements, namely, Target ID 381, Located Position 382, Located Section 383, Reference Position Tag 384, Estimation Error 385, Reading Time 386, and Reader 387. Target ID 381 indicates for which management target each record of the position information table 380 indicates position information by an identifier of the management target registered in the target table 310. Located Position 382 represents positional coordinates of the located position of each management target estimated by the estimation unit 232. Located Section 383 indicates a section within which each management target is estimated to be located by a value of a section ID registered in the section table 320. In the example of FIG. 12, a management target identified by a target ID 'IT11' is estimated to be located at a point having coordinates (u1, v1, h1) within a section identified by a section ID 'AA10'. Reference Position Tag 384 indicates a reference position tag selected when estimating the located position of each management target by a value of the tag ID of that reference position tag. Estimation Error 385 indicates a value of an estimation error derived using equation (2) and equation (3) for the located position of each management target. Reading Time 386 indicates the time at which the tag ID was read from the target tag 50 of each management target (the first reading time). Reader 387 indicates the tag reader 110 that has read the tag ID from the target tag 50 of each management target by a value of Reader ID 341 of the reader table 340.

3-4. Presenting Position Information

The display control unit 233 can cause the display unit 171 of the user terminal 160 to display information regarding each of the plurality of management targets in order to assist a user in getting to know the states of the management targets. In particular, in the present embodiment, the display control unit 233 causes position information to be displayed on a screen based on a result of estimation of a located position of each management target by the estimation unit 232.

(1) Determination of Estimated Area

For example, the display control unit 233 may superimpose display objects indicating located positions of one or more management targets estimated to be within a section selected by a user on a map image based on map data of that section. However, the combination of information reading from RFID tags and the self-localization technique may be affected by some error factors. Hence, the display control unit 233 may cause the display unit 171 to display an estimated area within which a management target is estimated to be located taking an estimation error of the located position of the management target into consideration in such a manner that a display object indicating the estimated area is superimposed. The display control unit 233 may determine the estimated area of the located position of the management target based on the located position estimated for the management target and the estimation error derived at the time of the estimation. The estimated area may be determined further based on the reading range of the tag reader 110.

As an example, the estimated area of the located position of the management target may be defined using a radius that depends on the estimation error with the estimated located position as a center. Typically, the estimated area may be circular. The display control unit 233 may determine the radius R of the estimated area in accordance with the following equation (4), for example:

$$R = E_{T1 \to T2} + D_{RANGE} \qquad (4)$$

where $D_{RANGE}$ represents the reading range (readable distance) of the tag reader 110 that has been used for the estimation of the located position of the management target. According to equation (4), the radius of the estimated area is equal to the sum of the following: the estimation error $E_{T1 \to T2}$ that depends on the cumulative amount of movement of the tag reader 110 between the first reading time T1 and the second reading time T2; and the reading range of the tag reader 110.

Figure 13A:
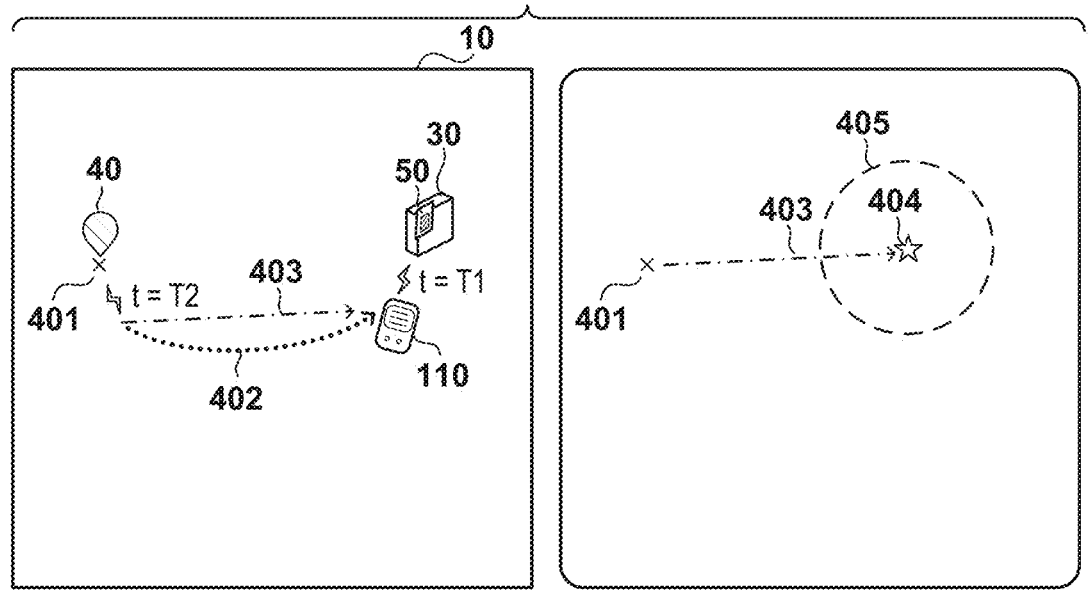
FIG. 13A is a first explanatory diagram about relationship between a movement path of a tag reader and a magnitude of an estimated area.
Figure 13B:
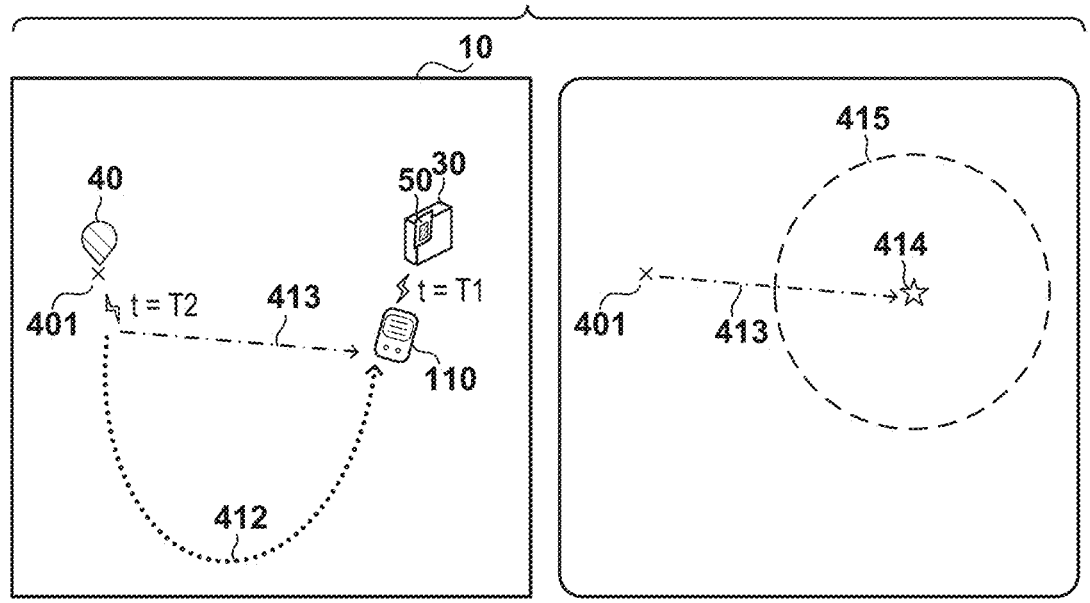
FIG. 13B is a second explanatory diagram about relationship between a movement path of a tag reader and a magnitude of an estimated area.

FIGS. 13A and 13B are explanatory diagrams about relationships between a movement path of the tag reader 110 and a magnitude of an estimated area. In the figures, the time T2 is the reading time at which the tag reader 110 read the tag ID from the position tag 40 installed at the point 401 in the section 10. The time T1 is the time at which the tag reader 110 read the tag ID from the target tag 50 attached to the management target 30. The first scenario illustrated in the left half of FIG. 13A assumes that the tag reader 110 moved along the non-linear movement path 402 from the time T2 to the time T1. The vector 403 is a linear vector from the starting point of the movement path 402 toward its ending point.

The point 404 illustrated in the right half of FIG. 13A is a located position estimated for the management target 30 based on the results of tag reading at the times T1 and T2 by the tag reader 110 in the first scenario. The point 404 is located at the position offset from the position of the point 401, at which the position tag 40 is installed, by the vector 403 that represents the relative amount of movement of the tag reader 110 between the two reading times T1, T2. However, the management target 30 may not be present strictly at this point 404, and is estimated be located within the approximately-circular estimated area 405 depicted around the central point 404. The magnitude of the estimated area 405 is based on a cumulative amount of movement along the movement path 402 of the tag reader 110 between the two reading times T1, T2 as described above.

The second scenario illustrated in the left half of FIG. 13B assumes that the tag reader 110 moved along the non-linear movement path 412 from the time T2 to the time T1, which is longer than the movement path 402 of the first scenario. The vector 413 is a linear vector from the starting point of the movement path 412 toward its ending point.

The point 414 illustrated in the right half of FIG. 13B is a located position estimated for the management target 30 based on the results of tag reading at the times T1 and T2 by the tag reader 110 in the second scenario. The point 414 is located at the position offset from the position of the point 401, at which the position tag 40 is installed, by the vector 413 that represents the relative amount of movement of the tag reader 110 between the two reading times T1, T2. However, the management target 30 may not be present strictly at this point 414, and is estimated be located within the approximately-circular estimated area 415 depicted around the central point 414. The magnitude of the estimated area 415 is based on a cumulative amount of movement along the movement path 412. Since the movement path 412 is longer than the movement path 402, the estimated area 415 in the second scenario is larger than the estimated area 405 in the first scenario.

It should be noted that the calculation equation for determining the radius R of the estimated area is not limited to the above-described equation (4). For example, the term of reading range $D_{RANGE}$ may be omitted. Also, the term of reading range $D_{RANGE}$ may be a variable value that depends on a reception level of a signal at the time of reading the tag ID from the target tag 50.

The display control unit 233 refers to the position information table 380 of the database 220 to obtain positional coordinates of a located position, an estimation error, and a reader ID of a corresponding tag reader 110 of a management target for which position information is requested to be displayed. The display control unit 233 determines a radius R of the estimated area based on the obtained estimation error and the reading range of the tag reader 110. As the radius R of the estimation error herein represents a distance in the real space, the display control unit 233 converts the radius R into a distance on a screen using a scale of a displayed map image. Then, the display control unit 233 causes a display object representing the estimated area to be displayed on a screen such that the object is superimposed on the map image with its center aligned with the positional coordinates of the located position of the management target. The user can intuitively get to know within which area of the real space the management target is estimated to be present by viewing this display object on the screen, taking an impact of the cumulative error of PDR which is different depending on a situation into consideration.

(2) Grid-Based and Section-Based Displays

In a practical example, the display control unit 233 may provide a user with a grid-based display described below to facilitate a broad or general understanding of located positions of a large number of management targets. For example, the real space is regularly segmented into a plurality of coordinate regions (also referred to as grid). In the present specification, a grid-based display refers to a display of position information summarized per grid cell. On the other hand, a section-based display refers to a display of position information summarized per section. It may be made possible for a user to selectively switch between the grid-based display and the section-based display.

Figure 14:
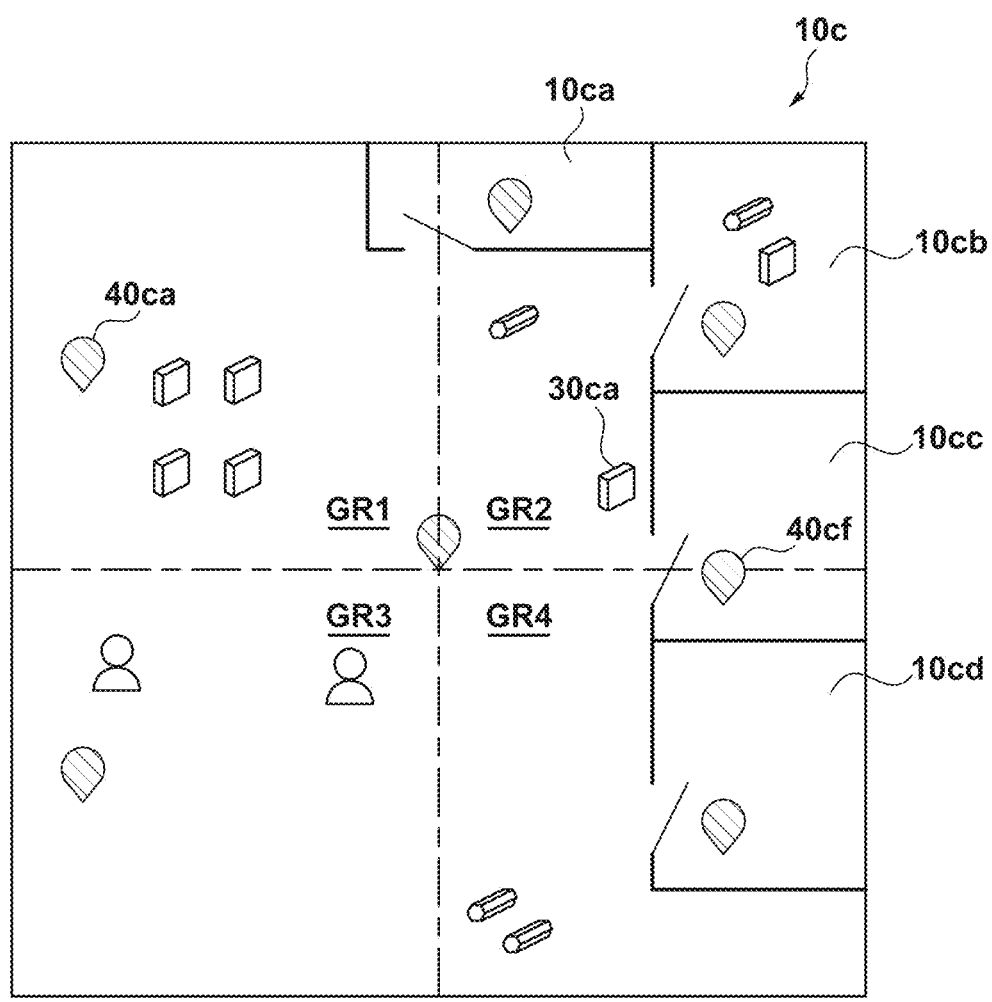
FIG. 14 is an explanatory diagram illustrating examples of a plurality of coordinate regions (a grid).

FIG. 14 shows an example of a plurality of coordinate regions set in a real space. A section 10c illustrated in FIG. 14 corresponds to a single floor of a building. The section 10c includes sections 10ca, 10cb, 10cc and 10cd, which correspond to rooms on that floor. A total of four rectangular coordinate regions GR1 to GR4, arranged in a 2×2 arrangement, are set regularly in the section 10c in the figure. The shapes of the coordinate regions may be uniform, and the spacing of the boundary lines between the coordinate regions may be constant on each coordinate axis. The boundary lines of the coordinate regions indicated by the dot-dash lines in the figure are not necessarily aligned with the boundary lines of the sub-sections (the sections 10ca, 10cb, 10cc and 10cd) in the space indicated by the bold lines in the figure. FIG. 14 also illustrates icons representing installation positions of a plurality of position tags (for example, position tags 40ca and 40cf). In addition, icons representing estimated positions of a plurality of management targets (for example, an item 30ca) are also illustrated. The number and size of the coordinate regions are not limited to the example illustrated in FIG. 14. The size of the coordinate regions may be fixedly set in advance. Also, the display control unit 233 may set the size of the coordinate regions to a different value depending on the size of the section to be displayed.

Figure 15:
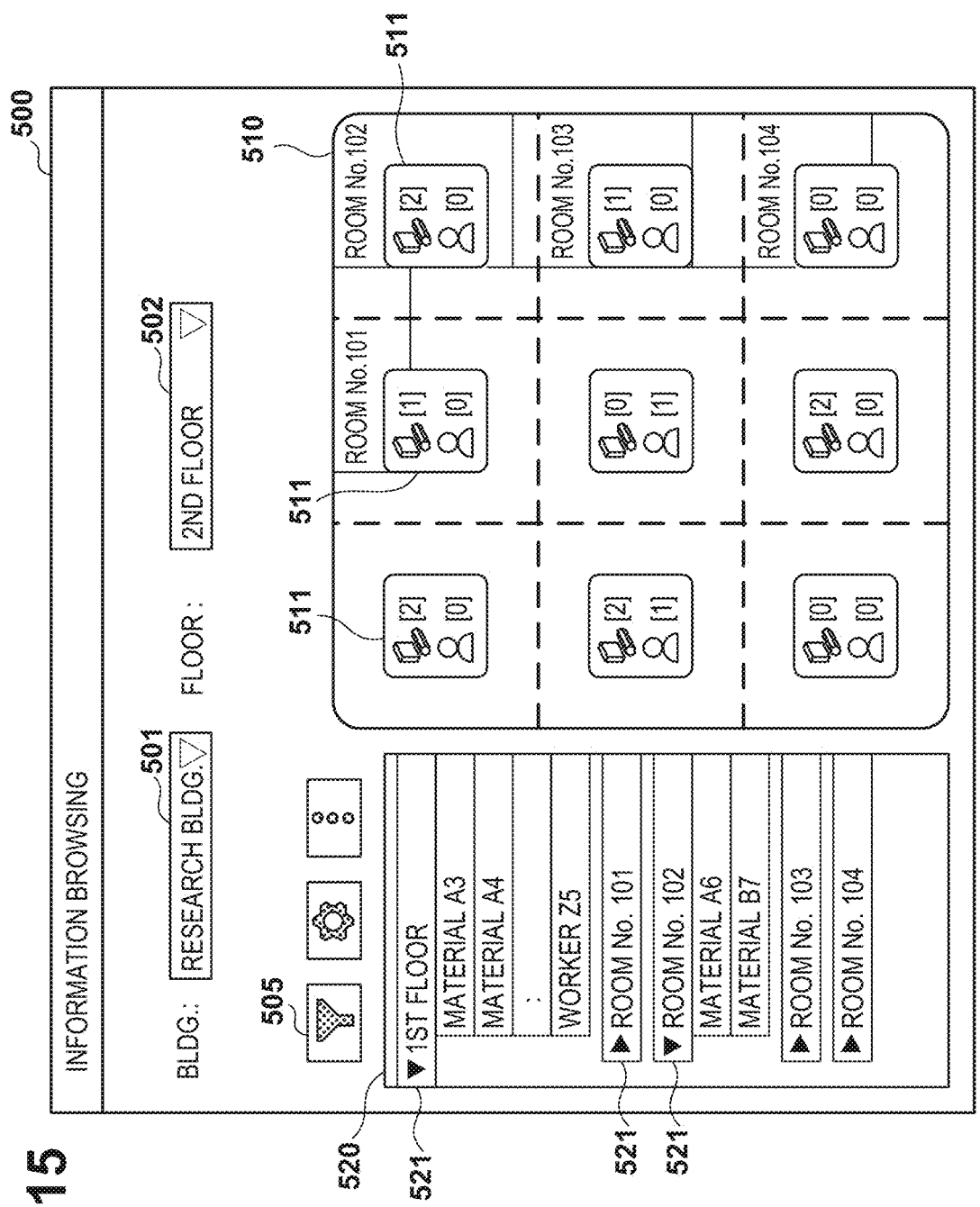
FIG. 15 is an explanatory diagram illustrating a first example of a configuration of an information browsing screen.

FIG. 15 illustrates a first example of a configuration of an information browsing screen 500 that may be provided by the display control unit 233 in the present embodiment. For example, the information browsing screen 500 may be called in response to a user input via the operation unit 165 of the user terminal 160 and displayed by the display unit 171 of the user terminal 160. With reference to FIG. 15, the information browsing screen 500 includes a building selection field 501, a floor selection field 502, a function button 505, a map display area 510, and a list display area 520. When a building and a floor for which the user wishes to browse position information are selected in the fields 501 and 502, a map image of the selected floor is displayed in the map display area 510. The display control unit 233 superimposes boundary lines (the dashed lines in the figure) representing boundaries of the plurality of coordinate regions on this map image. In the example in FIG. 15, a total of nine coordinate regions, arranged in a 3×3 layout, are set in the selected floor.

In the map display area 510, position information of a large number of management targets is displayed in the form of statistics information per coordinate region basis. The statistics information herein may include one or more of the following, for example:

1) the number of management targets estimated to be currently located in each coordinate region;
2) the number of management targets, for each class, estimated to be currently located in each coordinate region;
3) the number of management targets estimated to be located in each coordinate region within a certain period in the past;
4) the number of management targets, for each class, estimated to be located in each coordinate region within a certain period in the past; and
5) the number of targets in any of 1) to 4) that conform to specific filtering conditions.

The filtering conditions may include one or more of, for example, a condition related to management targets, and a condition related to a tag reader that detected a management target. For example, the condition related to management targets may include a condition related to a name or a target type of management targets. The condition related to a tag reader may include a condition to extract only management target(s) detected by a specific tag reader (for example, the tag reader used by a logged-in user). The function button 505 of the information browsing screen 500 is a button for calling a UI for allowing a user to designate the filtering conditions. Such a UI may be configured according to any publicly-known method, and will therefore not be described in detail here.

The boxes 511 superimposed on the map display area 510 indicate the number of items and the number of users that are estimated to be currently located in the corresponding coordinate regions. Presenting the statistics information in units of coordinate regions in this manner makes it possible for a user to easily and quickly ascertain an overview of located positions of management targets. This also makes it possible to avoid cluttering the screen with information in situations where a large number of management targets exist.

In the list display area 520, the management targets that are estimated to be located on the floor selected by the user are listed in the form of a list of groups for each located section. In the example of FIG. 15, the list display area 520 includes a plurality of list items 521, which can be expanded and collapsed. When the user operates one of the list items 521, a list of management targets located in the section corresponding to the operated list item 521 is displayed (and if the same list item 521 is operated again, the list of management targets which have been displayed will be hidden). In a case where the user selects a specific coordinate region in the map display area 510, the management targets displayed in the list display area 520 may be reduced only to the management targets estimated to be located in the selected coordinate region.

Figure 16:
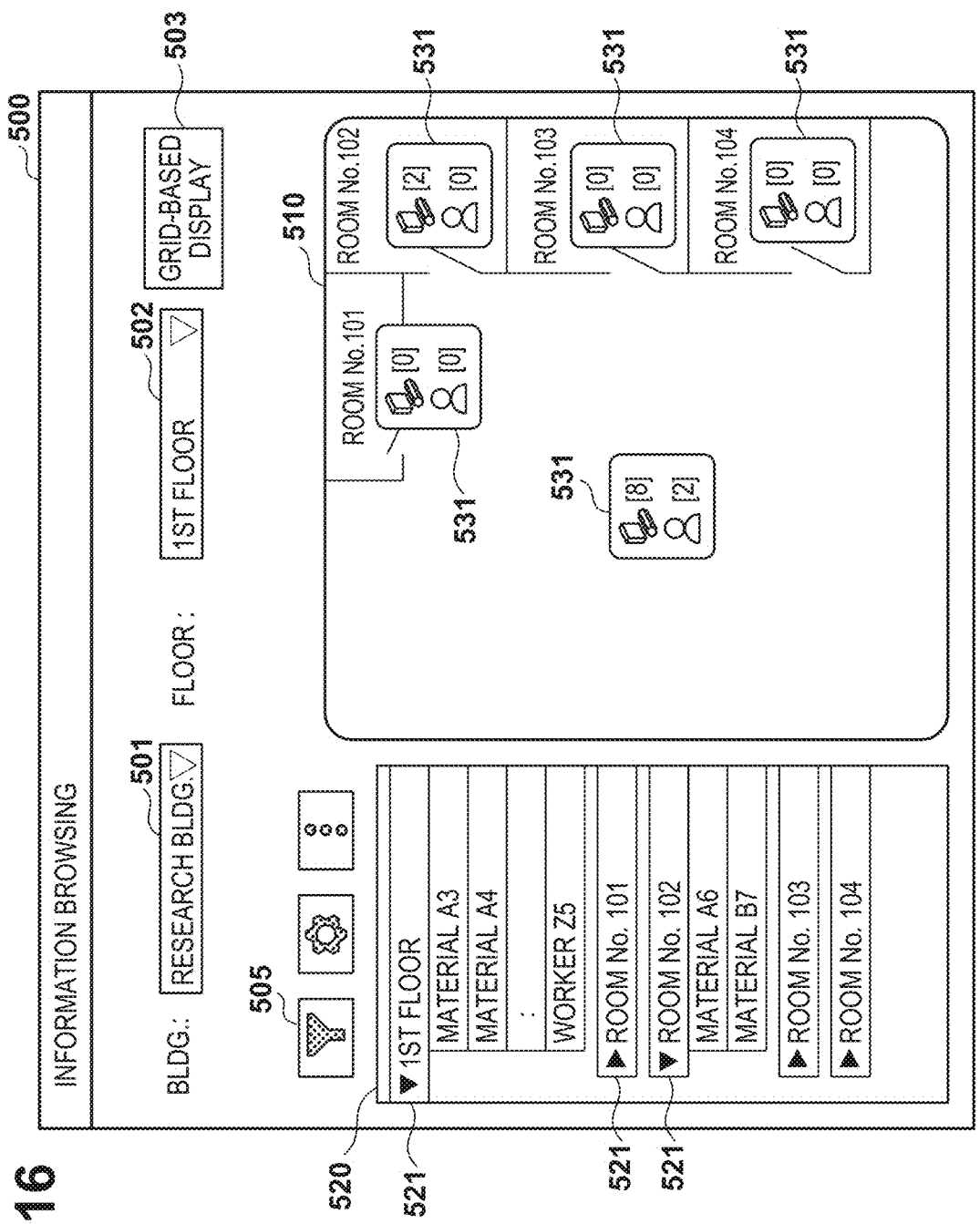
FIG. 16 is an explanatory diagram illustrating a second example of a configuration of an information browsing screen.

FIG. 16 illustrates a second example of a configuration of the information browsing screen 500 that may be provided by the display control unit 233 in the present embodiment. In the second example, the information browsing screen 500 includes a display switch button 503 in addition to the constituent elements described in connection with FIG. 15. The display switch button 503 is a button for switching the form of display of position information in the map display area 510 between the grid-based display and the section-based display. In the example of FIG. 16, the section-based display is selected. In the map display area 510, five boxes 531 are superimposed on the map image including five sections. Each box 531 indicates statistics information (the number of items and the number of users) for management targets that are estimated to be located in the corresponding section.

(3) Display of Position Information Including Estimated Area

The display control unit 233 may cause, at an arbitrary timing, located positions estimated by the estimation unit 232 and estimated ranges based on the estimation errors to be displayed on a screen for respective management targets 30.

In a practical example, the display control unit 233 causes the display unit 171 of the user terminal 160 to display a list of a plurality of management targets as described using FIGS. 15 and 16. Then, in response to a first management target being designated by a user from among the management targets in the list, the display control unit 233 causes the display unit 171 to display a first estimated area within which the first management target is estimated to be located in the real space. In the example of the grid-based display in FIG. 15, the above list of management targets may be a list of management targets that are estimated to be located in a grid cell designated by the user from among a plurality of grid cells. In the example of the section-based display in FIG. 16, the above list of management targets may be a list of management targets that are estimated to be located in a section designated by the user from among a plurality of sections. In this manner, progressively displaying information in detail through the steps of displaying grid-based or section-based statistics information, designating a grid cell or a section, and then designating a management target makes it possible to smoothly guide the user to position information of each management target while avoiding information congestion.

Figure 17:
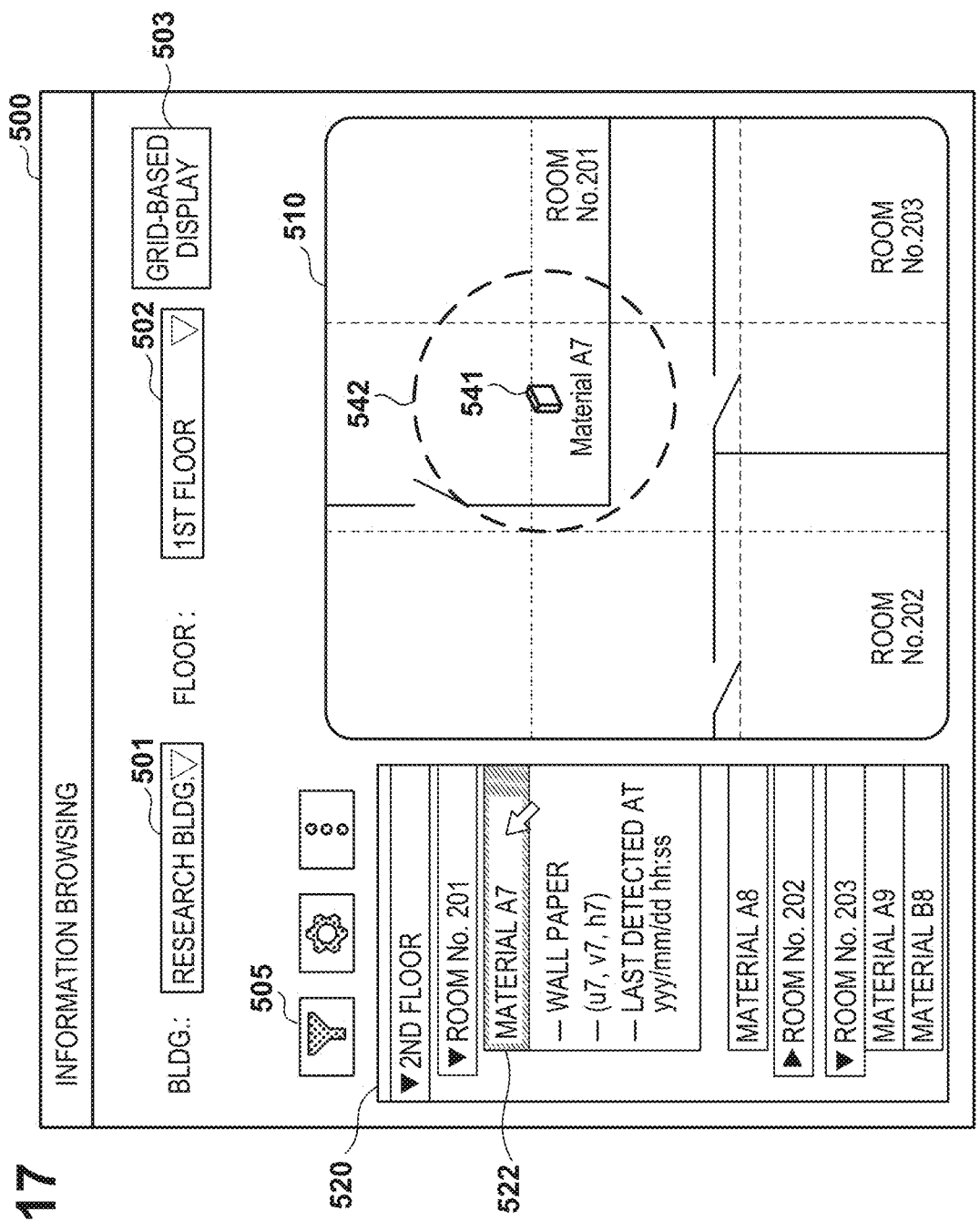
FIG. 17 is an explanatory diagram illustrating a first example of a display of position information including an estimated area.

FIG. 17 is an explanatory diagram illustrating a first example of a display of position information including an estimated area. In the first example, an icon 541 and an indication 542 are displayed in the map display area 510 in response to the user selecting a list item 522 in the list display area 520 of the information browsing screen 500. The icon 541 is a display object indicating the located position of the material A7 which is the management target corresponding to the list item 522. The indication 542 is a display object indicating the estimated area within which the material A7 is estimated to be located. Considering a case where only the icon 541 is displayed, if the material A7 cannot be found at a point where the icon 541 is plotted, the user might think that the material A7 has moved to totally different place. In contrast, providing the indication 542 indicating the estimated area based on the estimation error as in the example of FIG. 17 allows the user to preferentially search the area indicated by the indication 542 in the real space so that the user can easily find the material A7. For example, the display control unit 233 may switch the display state of the indication 542 between visible and invisible in response to a tap on the icon 541 or the indication 542 or any other user input.

Figure 18:
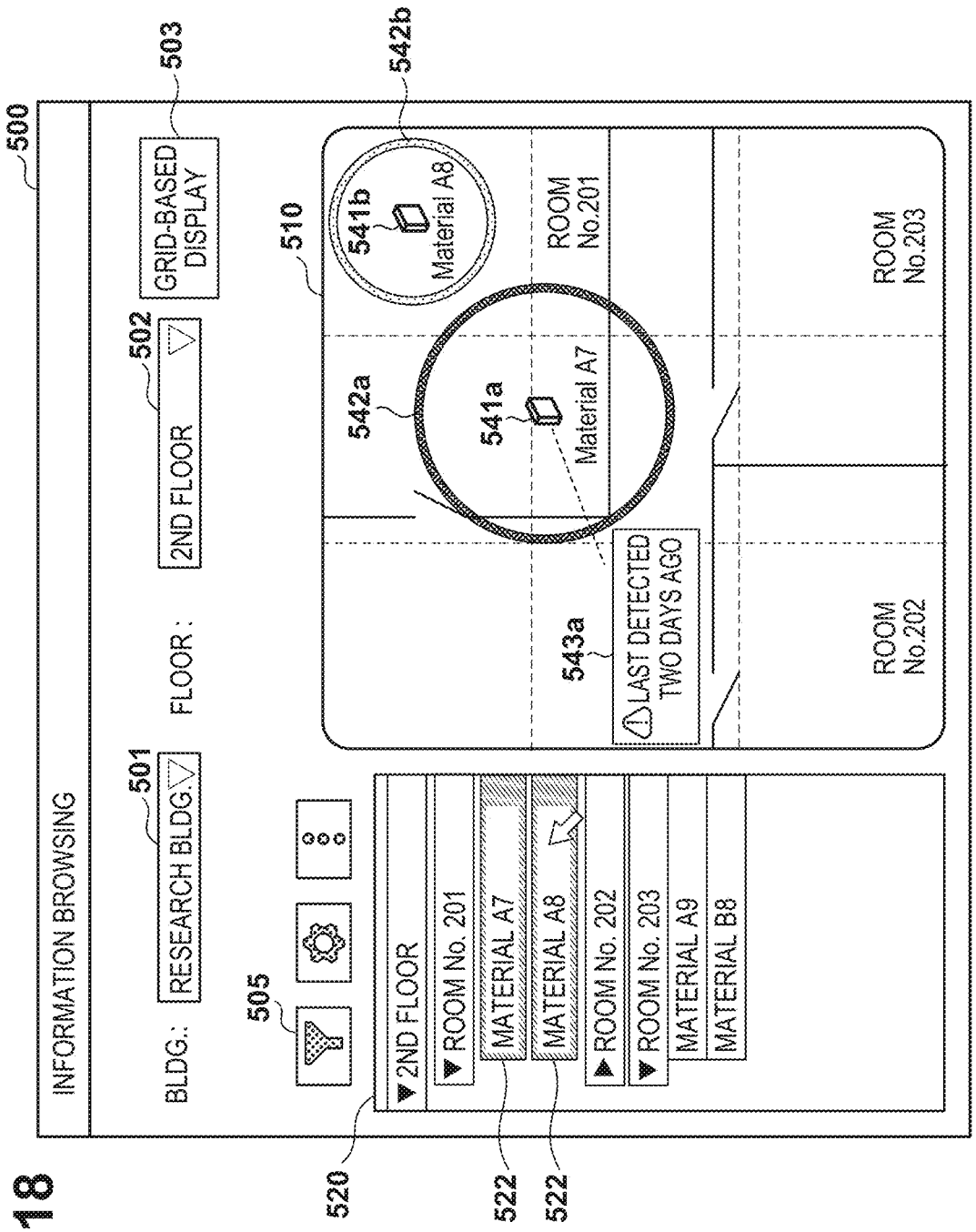
FIG. 18 is an explanatory diagram illustrating a second example of a display of position information including an estimated area.

FIG. 18 is an explanatory diagram illustrating a second example of a display of position information including an estimated area. In the second example, the display control unit 233 determines a display mode of an indication indicating an estimated area for a management target 30 based on elapsed time from a reading time of a tag ID from the target tag 50 of the management target 30 (the first reading time). The display mode herein may include one or more of a display color, a pattern of lighting/blinking, presence or absence of a supplemental text, and content of the supplemental text. For example, the display control unit 233 may determine a display color of the indication indicating the estimated area by comparing the elapsed time from the first reading time with a predetermined reference value as follows:

if the elapsed time is less than the reference value, then set the display color to a first color; and if the elapsed time exceeds the reference value, then set the display color to a second color.

For example, the first color may be blue, and the second color may be yellow so as to alert the user.

With reference to FIG. 18, an icon 541a and an indication 542a, and an icon 541b and an indication 542b, are displayed in the map display area 510 in response to the user selecting list items 522 and 523 in the list display area 520. The icon 541a indicates the located position of the material A7 corresponding to the list item 522. The indication 542a indicates the estimated area within which the material A7 is estimated to be located. The icon 541b indicates the located position of the material A8 corresponding to the list item 523. The indication 542b indicates the estimated area within which the material A8 is estimated to be located. As understood from FIG. 18, the estimated area indicated by the indication 542a is larger than the estimated area indicated by the indication 542b. This is because the estimation error in estimating the located position of the material A7 is evaluated to be larger than the estimation error in estimating the located position of the material A8 due to a larger cumulative amount of movement of the tag reader 110, for example.

In addition, the display color of the indication 542a is different from the display color of the indication 542b. For example, the display color of the indication 542a is yellow, which means that a time period exceeding the reference value has elapsed since the last time the material A7 was detected. In the example of FIG. 18, a supplemental text 543a is also displayed, which notifies the user that two days have passed since the last detection time of the material A7. Such a display mode can make the user aware of a possibility that the management target was moved during the elapsed time (and thus the management target is possibly no longer present within the displayed area) in a case where a long time period has elapsed since the last detection time of each management target.

Figure 19:
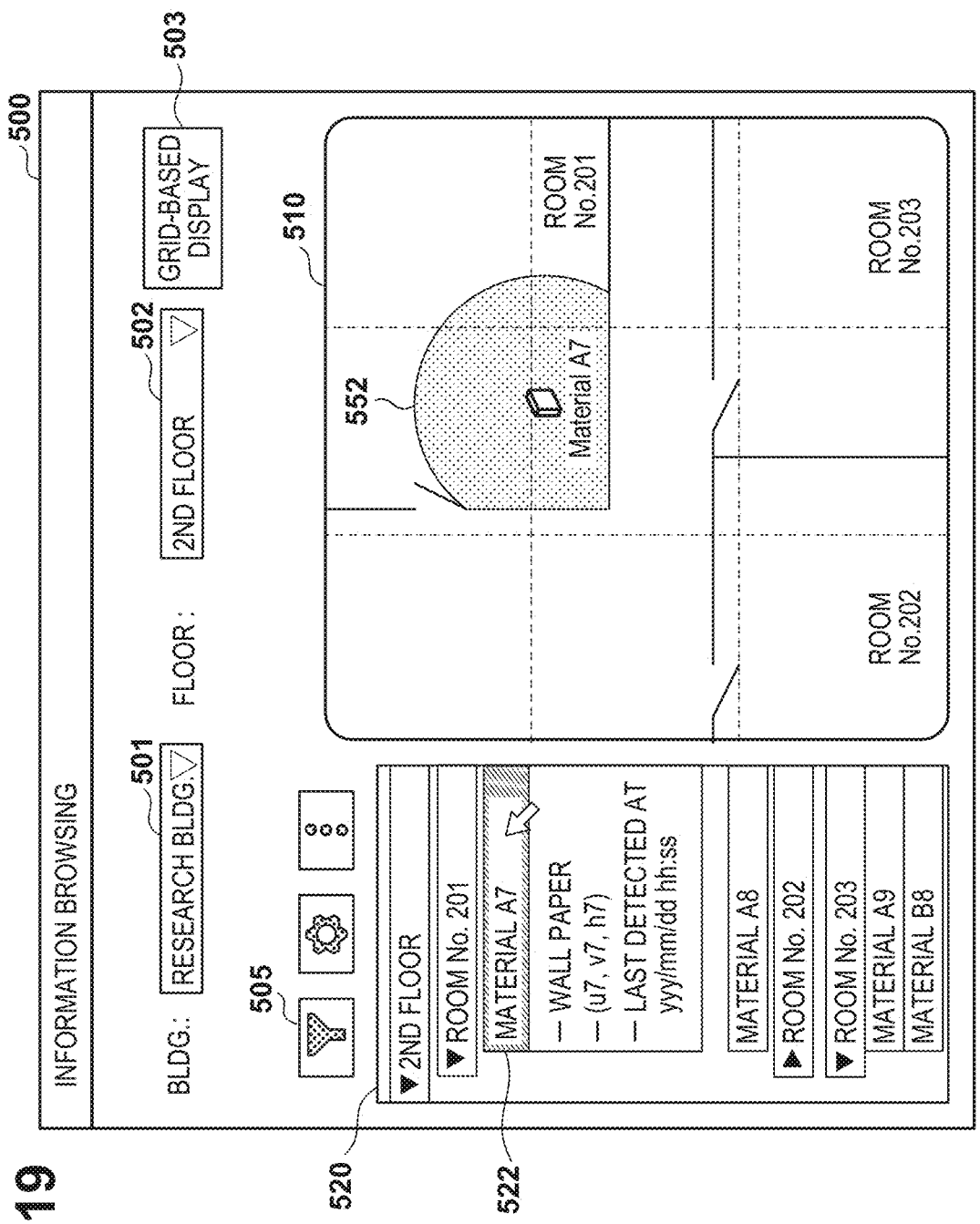
FIG. 19 is an explanatory diagram illustrating a third example of a display of position information including an estimated area.

FIG. 19 is an explanatory diagram illustrating a third example of a display of position information including an estimated area. In the third example, the display control unit 233 determines an estimated area for a management target which is estimated to be located in a section based on a located position of the management target and an estimation error as well as boundary data that defines a boundary position of the section. More specifically, for example, assume that an estimated area tentatively defined using a radius R from equation (4) for a certain management target stretches across a boundary (for example, a wall that blocks wireless signals) of the located section of the management target. In that case, the display control unit 233 may trim the estimated area at the boundary of the located section under a presupposition that the management target does not exist in the part beyond the boundary. It should be noted that the estimated area may not be trimmed at a boundary that does not prevent movement, such as a door.

With reference to FIG. 19, an indication 552 is displayed in the map display area 510 in response to the user selecting the list item 522 in the list display area 520. The indication 552 indicates the estimated area within which the material A7 is estimated to be located. In the first example in FIG. 17, the estimated area indicated by the indication 542 for the material A7 is circular with the located position of the material A7 as the center whereas, in the third example in FIG. 19, the estimated area indicated by the indication 552 is trimmed at the boundary of the located area of the material A7 ("Room No. 201"). In an environment in which management targets are not supposed to move linearly across boundaries of sections, a more probable estimated area of a management target can be presented to a user by transforming the estimated area to match it with the boundaries of sections in this way instead of simply defining it with a circle.

Figure 20:
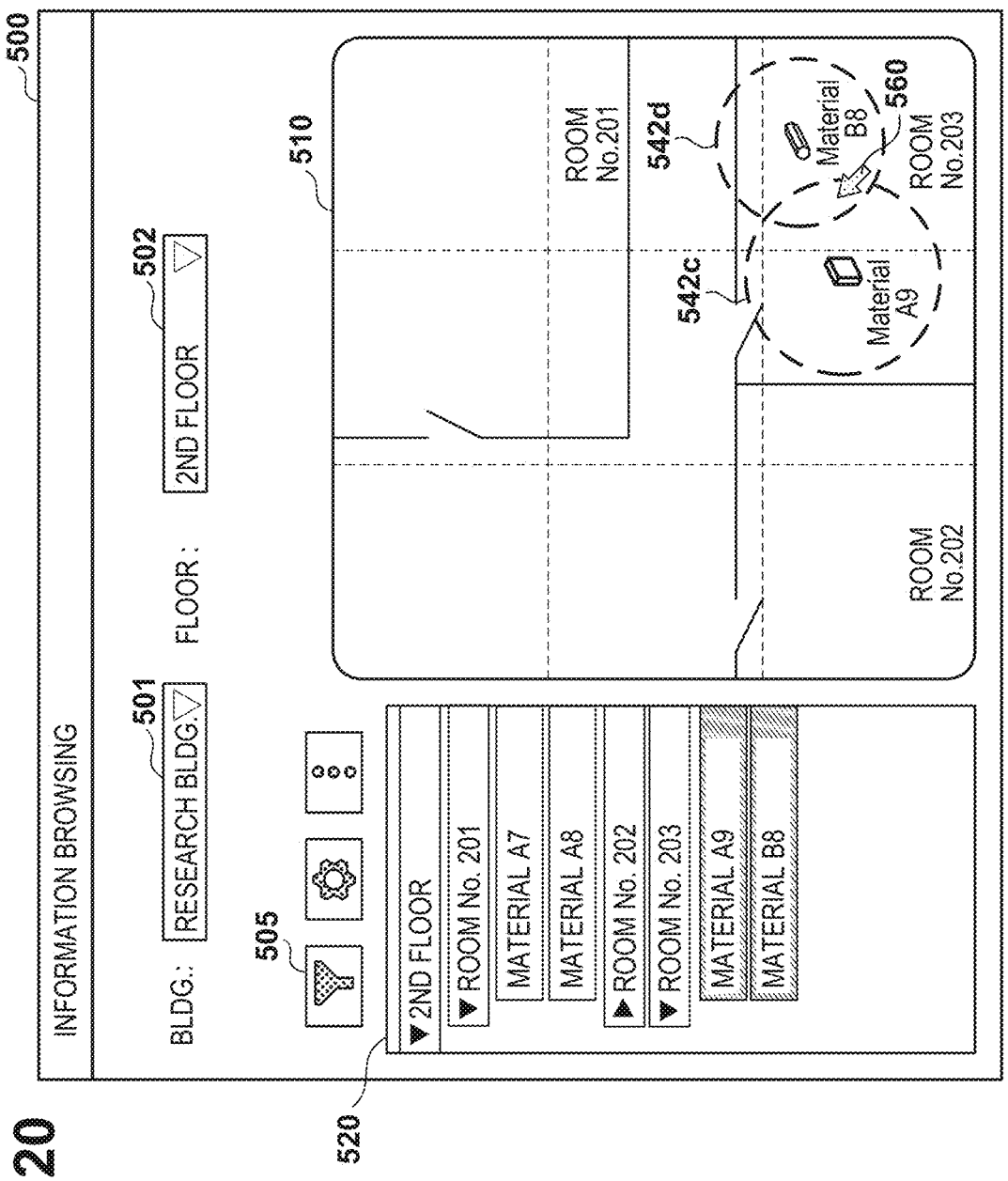
FIG. 20 is an explanatory diagram illustrating a fourth example of a display of position information including an estimated area.

FIG. 20 is an explanatory diagram illustrating a fourth example of a display of position information including an estimated area. In the fourth example, an indication 542c and an indication 542d are displayed in response to the user pointing at a certain spot using a cursor 560 in the map display area 510. The indication 542c indicates the estimated area within which the material A9 is estimated to be located, including the spot that is pointed at inside. The indication 542d indicates the estimated area within which the material B8 is estimated to be located, including the spot that is pointed at inside. The display control unit 233 compares an estimated area defined based on a located position and an estimation error for each management target with a spot that is pointed at to find management targets of which estimated areas include that spot inside and conduct the display as illustrated in FIG. 20. In this manner, the user can easily know through an interaction on the screen which one or more management targets are estimated to be located near a spot in which he or she is interested.

Note that the examples of display of position information described using FIGS. 17 to 20 may be combined in any way with each other.

4. Flow of Processing

In this section, some examples of flows of processing that may be performed by the display control system 1 will be described using the flowcharts of FIGS. 21 to 23. Note that a process step is abbreviated as S (step) in the following descriptions.

4-1. Data Transmission Processing

Figure 21:
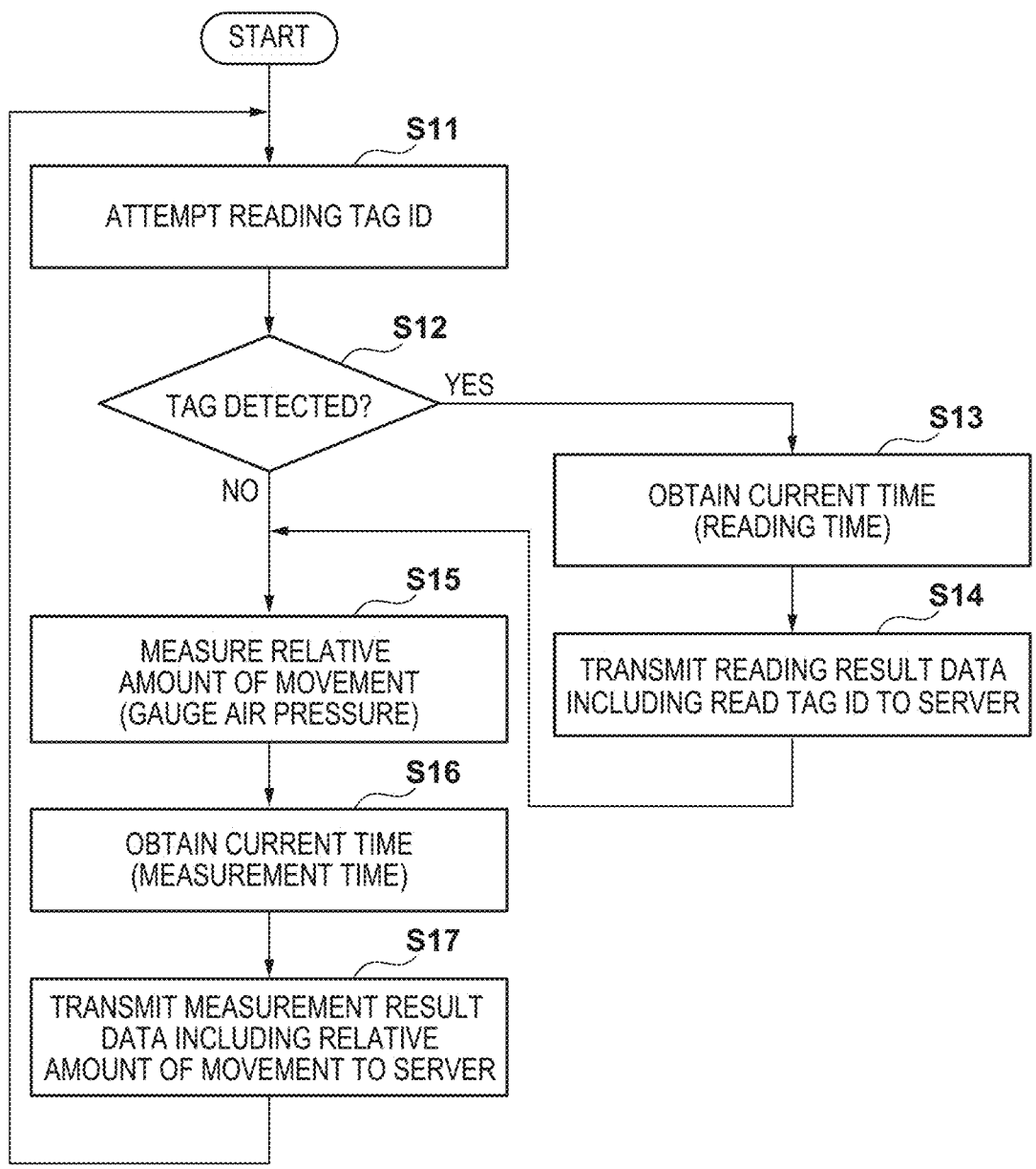
FIG. 21 is a flowchart illustrating an example of a flow of data transmission processing according to an embodiment.

FIG. 21 is a flowchart illustrating an example of a flow of data transmission processing performed by the portable system 100.

First, in S11, the reading unit 116 of the tag reader 110 attempts to read a tag ID from a nearby RFID tag by emitting electromagnetic waves within the reading range. When a tag ID has been received from a nearby RFID tag utilizing the energy of the electromagnetic waves as a result of the attempt of tag reading (S12-YES), the processing proceeds to S13. Meanwhile, when no tag ID is received (S12-NO), the processing proceeds to S15.

In S13, the control unit 111 obtains the current time as a reading time of the tag ID by referring to an internal real-time clock, for example. Next, in S14, the control unit 111 transmits reading result data including the read tag ID, the reading time, the reception level, and the reader ID of the tag reader 110 to the management server 200 via the communication unit 113. Then, the processing proceeds to S15.

In S15, the measuring unit 114 of the tag reader 110 measures a relative amount of movement of the tag reader 110 based on sensor data output from a three-axis acceleration sensor, a gyro sensor, and a geomagnetic sensor, for example. At this point, the measuring unit 114 may further cause an air pressure sensor to gauge an atmospheric air pressure. Next, in S16, the control unit 111 obtains the current time as a measurement time. Then, in S17, the control unit 111 transmits measurement result data including the relative amount of movement measured by the measuring unit 114 (and the air pressure value), the measurement time, and the reader ID of the tag reader 110 to the management server 200 via the communication unit 113.

Then, the processing returns to S11. Such data transmission processing may be performed iteratively with a constant measurement periodicity while the attempt of tag reading is active in the portable system 100.

4-2. Position Estimation Processing

Figure 22:
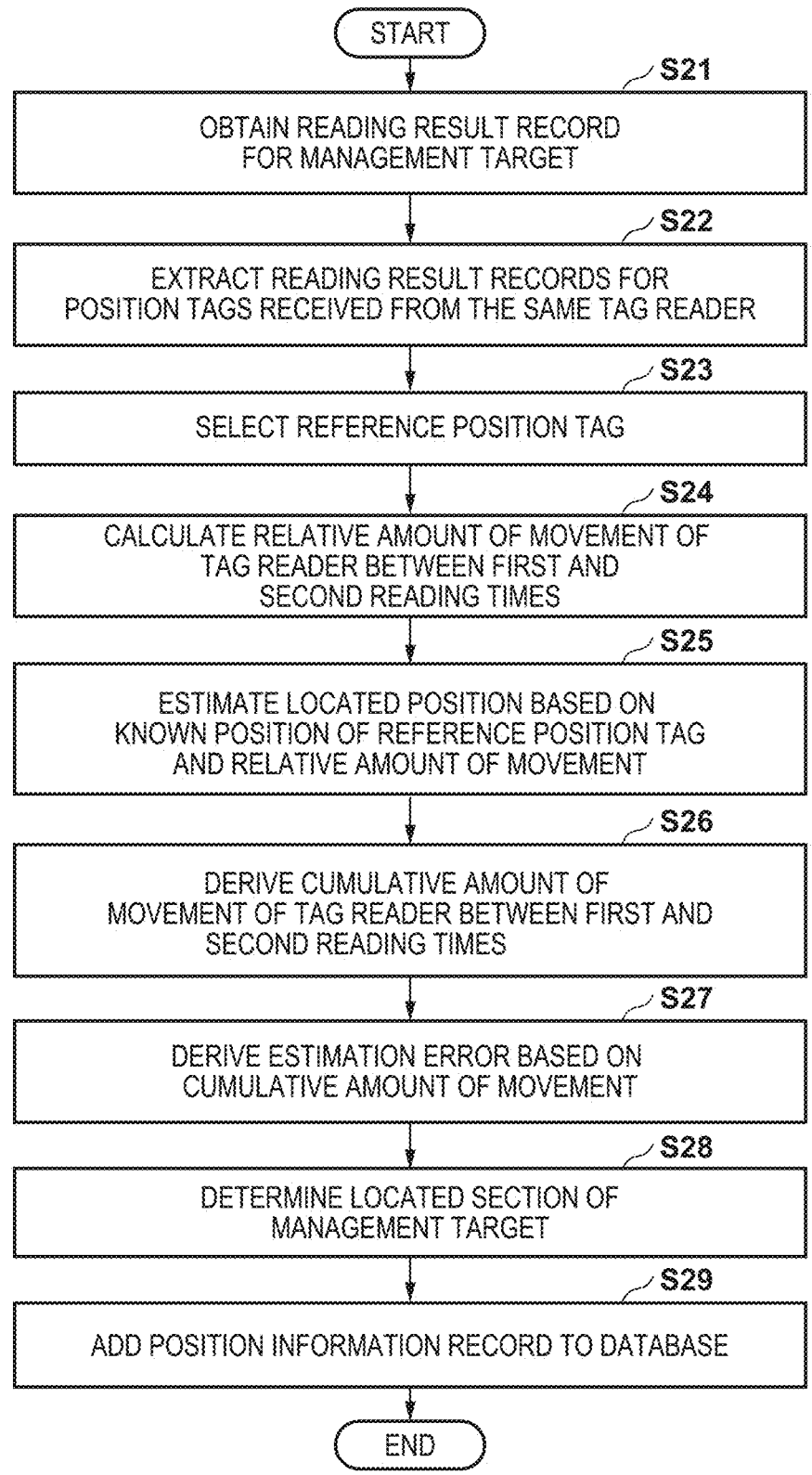
FIG. 22 is a flowchart illustrating an example of a flow of position estimation processing according to an embodiment.

FIG. 22 is a flowchart illustrating an example of a flow of position estimation processing performed by the management server 200. At the point in time when the position estimation processing of FIG. 22 is initiated, it is assumed that there are some measurement result records accumulated in the movement amount table 360 and some reading result records accumulated in the tag detection table 370.

First, in S21, the estimation unit 232 of the management server 200 focuses on one management target and obtains a reading result record for the target tag 50 attached to the management target from the tag detection table 370. Next, in S22, the estimation unit 232 extracts, from the tag detection table 370, reading result records for one or more position tags 40 received from the same tag reader 110 as that of the reading result record obtained above. Next, in S23, the estimation unit 232 selects one reference position tag based on correlation between the reading result record for the target tag 50 and the one or more reading result records for position tags 40.

Next, in S24, the estimation unit 232 refers to measurement result records in the movement amount table 360 to calculate the relative amount of movement of the tag reader 110 between the reading time of the target tag 50 (the first reading time) and the reading time of the reference position tag (the second reading time). Next, in S25, the estimation unit 232 estimates a located position of the management target of interest based on the calculated relative amount of movement of the tag reader 110 and the known position of the reference position tag. The estimation unit 232 may estimate the located position of the management target in accordance with equation (1) described above, for example.

Next, in S26, the estimation unit 232 derives the cumulative amount of movement of the tag reader 110 between the first reading time and the second reading time. The estimation unit 232 may derive the cumulative amount of movement in accordance with equation (2) described above, for example. Next, in S27, the estimation unit 232 derives the estimation error by multiplying the derived cumulative amount of movement by a predetermined coefficient. Furthermore, in S28, the estimation unit 232 determines that the section associated with the reference position tag in the position tag table 330 is the located section of the management target of interest.

Then, in S29, the estimation unit 232 adds, to the position information table 380 of the database 220, a position information record indicating the target ID of the management target, positional coordinates of the estimated located position, the estimation error, and the located section.

The estimation unit 232 may sequentially focus on respective ones of one or more management targets that may have moved during a certain period to iterate the above-described processing on them. Such processing is performed on a regular basis so that the position information can be maintained in the database 220 in which the latest state of each management target is reflected.

4-3. Display Control Processing

Figure 23:
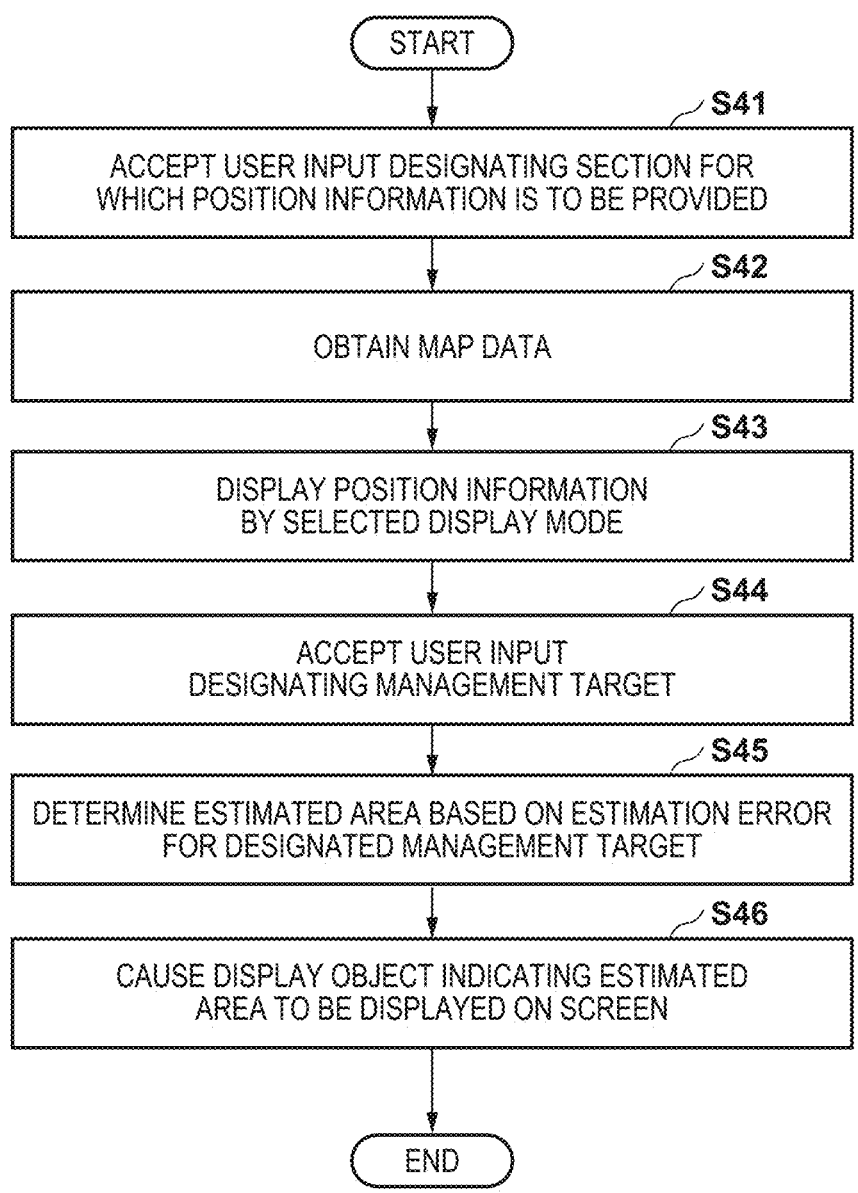
FIG. 23 is a flowchart illustrating an example of a flow of display control processing according to an embodiment.

FIG. 23 is a flowchart illustrating an example of a flow of display control processing performed by the user terminal 160 and the management server 200 cooperating with each other. Herein, it is assumed that the information browsing screen 500 described using FIGS. 15 to 20 is called by a user and is displayed by the display unit 171 under control by the control unit 161 of the user terminal 160.

First, in S41, the display control unit 233 of the management server 200 accepts a user input designating a section for which position information is to be provided. For example, the user designates a building and a floor via the UI of the information browsing screen 500.

Next, in S42, the display control unit 233 obtains, from the database 220, map data registered in association with the designated section.

Next, in S43, the display control unit 233 causes position information for one or more management targets estimated to be present in the designated section in a display mode selected by the user (for example, the grid-based display or the section-based display). The position information displayed herein may be statistics information per coordinate region basis or per section basis. In addition, the display control unit 233 causes a list of the one or more management targets to be displayed on the screen.

Next, in S44, the display control unit 233 accepts a user input designating a management target included in the displayed list. Herein, it is assumed that one or a plurality of management targets may be designated by the user.

Next, in S45, the display control unit 233 determines an estimated area for the designated management target based on the estimation error of its located position. The estimated area is typically defined using the located position of the management target and a radius R determined in accordance with the above-described equation (4). However, in a case where the estimated area stretches across a boundary of the section, the estimated area may be trimmed at the boundary position.

Next, in S46, the display control unit 233 causes a display object indicating the estimated area determined in S45 to be displayed on the screen such that the object is superimposed on a map image of the designated section. At this point, the display control unit 233 may determine a display mode of the display object based on the elapsed time from the reading time at which the tag ID was read from the target tag of the management target.

The display control processing illustrated in FIG. 23 may be performed, in practice, interactively via a UI. When the user changes the designated section, position information for management targets estimated to be present in the newly-designated section is displayed on the screen. Moreover, when the user changes the designated management target, a display object indicating the estimated area of the located position of the newly-designated management target is displayed on the screen. The latest position information of management targets may be reflected in real-time on the screen based on data continuously received from the tag readers 110.

5. Conclusion

Various embodiments, practical examples and alteration examples of the technology according to the present disclosure have been described in detail using FIGS. 1 to 23. In at least some of the above-described embodiments, a management target that is movable in a real space has a first wireless device attached thereto that stores first identification information for identifying the management target. A second wireless device that stores specific second identification information is installed at a predetermined position in the real space. A reading apparatus reads first identification information from the first wireless device at a first reading time and reads second identification information from the second wireless device at a second reading time. Based on these reading results, an estimated area within which the management target is estimated to be located in the real space is displayed by a display apparatus. The magnitude of the estimated area is determined based on an amount of movement of the reading apparatus between the first reading time and the second reading time. Therefore, a user can efficiently carry out tasks. such as work planning, progress management, verification of placement of management targets, or investigation on a history of movement of the management targets while checking the estimated areas on the screen, which may vary depending on accuracy of position estimation.

In the above-described embodiments, the estimated area is determined based on a located position estimated for the management target and an estimation error that depends on the amount of movement of the reading apparatus. Therefore, when providing the user with position information of the management target relying on measurements of relative positional relationships between the first wireless device and the second wireless device, it is possible to let the user know straightforwardly through the magnitude of the estimated area how the cumulative error of the measurements affected the position estimation. In addition, by determining the estimated area further based on a reading range of the reading apparatus, it is possible to take a potential deviation of the estimated area that may be affected by the size of the reading range into account in the magnitude of the estimated area.

In the above-described embodiments, the estimation error may be derived by multiplying a cumulative amount of movement of the reading apparatus by a predetermined coefficient. In this manner, treating a fraction of the cumulative amount of movement as the estimation error allows the error of the position estimation to be easily derived without a complicated algorithm.

In the above-described embodiments, the estimated area is displayed in such a manner that a display object representing the estimated area is superimposed on a map image based on map data associated with the real space. Therefore, the user can intuitively get to know that the management target is likely to exist within the area indicated by the display object on the map.

In the above-described embodiments, a display mode of the display object indicating the estimated area may be determined based on elapsed time from the first reading time at which the first identification information was read from the first wireless device. Herein, the cumulative error of PDR and the elapsed time length from the reading time are both factors that affect the reliability of the result of position estimation. However, there is usually no correlation between the two factors. As such, representing the effect from the cumulative error by the magnitude of the estimated area while representing the effect from the elapsed time length by a display mode of the object (for example, a display color) allows the user to distinguish between the two factors to adequately evaluate the reliability of the result of position estimation.

It should be noted that the reading of identification information from the wireless devices described in this specification does not require communication with an external apparatus, such as a GPS satellite or a wireless base station. Hence, the above-described embodiments is particularly suitable for management of positions of movable items or users in an environment, such as indoors, underground, or inside tunnels, where external communication experiences difficulty.

6. Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-072671, which was filed on Apr. 26, 2023 and which is hereby incorporated by reference herein in its entirety.

What is claimed is:

1. A display control system comprising:
a first wireless device configured to be attached to a management target that is movable in a real space, the first wireless device storing first identification information for identifying the management target;
a second wireless device configured to be installed at a predetermined position in the real space, the second wireless device storing specific second identification information;
a reading apparatus that is capable of reading, from the first wireless device and the second wireless device, identification information stored in either the first wireless device or the second wireless device;
at least one processor; and
at least one memory, wherein the at least one processor and the at least one memory are configured to:
estimate a located position of the management target based on a result of reading the first identification information from the first wireless device at a first reading time by the reading apparatus and a result of reading the second identification information from the second wireless device at a second reading time by the reading apparatus, and
cause a display apparatus to display an estimated area within which the management target is estimated to be located in the real space based on the located position,
wherein a magnitude of the estimated area is based on an amount of movement of the reading apparatus between the first reading time and the second reading time.

2. The display control system according to claim 1, wherein the estimated area is determined based on the located position and an estimation error that depends on the amount of movement.

3. The display control system according to claim 2, wherein the estimated area is determined further based on a reading range of the reading apparatus.

4. The display control system according to claim 3, wherein the estimation error is derived by multiplying the amount of movement by a predetermined coefficient, and the estimated area is defined using a radius that depends on a sum of the reading range and the estimation error with the located position as a center.

5. The display control system according to claim 1, wherein the at least one processor and the at least one memory are configured to cause the display apparatus to display the estimated area in such a manner that a display object representing the estimated area is superimposed on a map image based on map data associated with the real space.

6. The display control system according to claim 5, wherein the map data includes data that defines a boundary position of a plurality of sections set in the real space, and
the estimated area is determined based on the located position, an estimation error that depends on the amount of movement, and the data.

7. The display control system according to claim 6, wherein the plurality of sections are sections divided from one another by blocking objects that block wireless signals.

8. The display control system according to claim 1, wherein the at least one processor and the at least one memory are configured to determine a display mode of a display object indicating the estimated area based on an elapsed time from the first reading time.

9. The display control system according to claim 8, wherein the at least one processor and the at least one memory are configured to determine a display color of the display object to be a first color when the elapsed time from the first reading time is smaller than a reference value, and determine the display color of the display object to be a second color that is different from the first color when the elapsed time from the first reading time is larger than the reference value.

10. The display control system according to claim 1, wherein the amount of movement of the reading apparatus between the first reading time and the second reading time is a cumulative amount of movement along a movement path of the reading apparatus.

11. The display control system according to claim 10, wherein the reading apparatus is configured to periodically measure an amount of movement of the reading apparatus, and
the cumulative amount of movement is derived by summing absolute values of amounts of movement in multiple measurement periods between the first reading time and the second reading time.

12. The display control system according to claim 1, wherein the management target is an item located in the real space or a user that acts in the real space.

13. The display control system according to claim 1, wherein the at least one processor and the at least one memory are configured to:
estimate located positions of a plurality of management targets that are movable in the real space,
cause the display apparatus to display a list of the plurality of management targets, and
cause the display apparatus to display a first estimated area within which a first management target is estimated to be located in the real space in a case where the first management target is designated by a user from among the plurality of management targets.

14. The display control system according to claim 13, wherein the real space is regularly segmented into a plurality of coordinate regions, and
the list of the plurality of management targets is a list of management targets that are estimated, by the at least one processor and the at least one memory, to be located in a coordinate region designated by the user from among the plurality of coordinate regions.

15. An information processing apparatus for causing a display apparatus to display position information of a management target that is movable in a real space,
   wherein a first wireless device that stores first identification information for identifying the management target is configured to be attached to the management target, and
   a second wireless device that stores specific second identification information is configured to be installed at predetermined position in the real space,
   the information processing apparatus comprising:
   a communication interface configured to communicate with a reading apparatus capable of reading, from a wireless device, identification information stored in the wireless device;
   at least one processor; and
   at least one memory, wherein the at least one processor and the at least one memory are configured to:
   estimate a located position of the management target based on a result of reading the first identification information from the first wireless device at a first reading time by the reading apparatus and a result of reading the second identification information from the second wireless device at a second reading time by the reading apparatus, and
   cause the display apparatus to display an estimated area within which the management target is estimated to be located in the real space based on the estimated located position,
   wherein a magnitude of the estimated area is based on an amount of movement of the reading apparatus between the first reading time and the second reading time.

16. A non-transitory computer-readable medium storing computer-executable instructions that, when executed by an information processing apparatus, cause the information processing apparatus to perform operations for causing a display apparatus to display position information of a management target that is movable in a real space, wherein a first wireless device that stores first identification information for identifying the management target is configured to be attached to the management target, and a second wireless device that stores specific second identification information is configured to be installed at predetermined position in the real space,
   the operations comprising:
   obtaining position information indicating a located position estimated for the management target based on a result of reading the first identification information from the first wireless device at a first reading time by a reading apparatus and a result of reading the second identification information from the second wireless device at a second reading time by the reading apparatus; and
   causing the display apparatus to display an estimated area within which the management target is estimated to be located in the real space based on the obtained position information,
   wherein a magnitude of the estimated area is based on an amount of movement of the reading apparatus between the first reading time and the second reading time.

* * * * *